(12) United States Patent
Daisuke

(10) Patent No.: US 8,773,551 B2
(45) Date of Patent: Jul. 8, 2014

(54) SIGNAL PROCESSING APPARATUS, SOLID-STATE IMAGE CAPTURING APPARATUS, ELECTRONIC INFORMATION DEVICE, SIGNAL PROCESSING METHOD, CONTROL PROGRAM AND STORAGE MEDIUM

(75) Inventor: Funao Daisuke, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 629 days.

(21) Appl. No.: 13/031,388

(22) Filed: Feb. 21, 2011

(65) Prior Publication Data

US 2011/0254974 A1    Oct. 20, 2011

(30) Foreign Application Priority Data

Feb. 25, 2010   (JP) .................................. 2010-41053

(51) Int. Cl.
*H04N 9/73* (2006.01)

(52) U.S. Cl.
USPC ...................................................... 348/223.1

(58) Field of Classification Search
CPC ......... H04N 9/735; H04N 9/045; H04N 9/67; H04N 9/77
See application file for complete search history.

(56) References Cited

U.S. PATENT DOCUMENTS

| 7,623,150 | B2* | 11/2009 | Kobayashi | ...................... 348/45 |
| 7,742,081 | B2* | 6/2010 | Chiba et al. | ................ 348/223.1 |
| 2002/0012463 | A1 | 1/2002 | Yamada | |
| 2008/0079816 | A1* | 4/2008 | Yen et al. | .................... 348/222.1 |
| 2008/0303919 | A1* | 12/2008 | Egawa | ........................ 348/223.1 |

FOREIGN PATENT DOCUMENTS

| JP | 5228110 | * 9/1993 |
| JP | 2001-359114 | 12/2001 |
| JP | 2004-064227 | 2/2004 |
| JP | 2004-194993 | 7/2004 |
| JP | 2007-096583 | 4/2007 |

OTHER PUBLICATIONS

Office Action issued in corresponding Chinese Application 201110046080.0 (Feb. 1, 2013).

\* cited by examiner

*Primary Examiner* — Luong T Nguyen
(74) *Attorney, Agent, or Firm* — Edwards Wildman Palmer LLP; David G. Conlin; Steven M. Jensen

(57) ABSTRACT

A signal processing apparatus is provided, for processing pixel signals corresponding to a plurality of respective pixels, the signal processing apparatus comprising a color matrix section for detecting brightness of the pixel and performs color adjustment on the pixel signals using a color matrix in accordance with the detected brightness of the pixel.

45 Claims, 11 Drawing Sheets

SIGNAL PROCESSING APPARATUS, SOLID-STATE IMAGE CAPTURING APPARATUS, ELECTRONIC INFORMATION DEVICE, SIGNAL PROCESSING METHOD, CONTROL PROGRAM AND STORAGE MEDIUM

This nonprovisional application claims priority under 35 U.S.C. §119(a) to Patent Application No. 2010-041053 filed in Japan on Feb. 25, 2010, the entire contents of which are hereby incorporated by reference.

BACKGROUND OF THE INVENTION

1. Field of the Invention

The present invention relates to a signal processing apparatus and a signal processing method for processing pixel signals corresponding to a plurality of respective pixels; a solid-state image capturing device, such as a CCD solid-state image capturing apparatus or a CMOS solid-state image capturing apparatus, and in particular, a solid-state image capturing apparatus which divides light into wavelengths using a color filter to obtain a color image signal so as to correspond to a human's sense of sight, for performing a photoelectric conversion on and capturing an image of image light from a subject, using the signal processing apparatus and the signal processing method; an electronic information device, such as a digital camera (e.g., a digital video camera or a digital still camera), an image input camera (e.g., a monitoring camera), a scanner, a facsimile machine, a television telephone device, and a camera-equipped cell phone device, which electronic information device includes the solid-state image capturing element as an image input device used in an image capturing section thereof; a control program in which processing procedures for allowing a computer to execute each of the steps of the signal processing method are described; and a computer-readable storage medium storing the control program.

2. Description of the Related Art

In the solid-state image capturing apparatus of this type, its signal output decreases when an image-capturing subject is dark, which makes noise relatively conspicuous. Thus, in order to obtain sufficient S/N even when an image-capturing subject is dark, obtainment of higher sensitivity for pixels and noise reduction become essential techniques.

In the meantime, high color reproducibility is also important in a color solid-state image capturing apparatus. However, the sensitivity to respective wavelengths is different between the human eyes and the pixels of solid-state image capturing apparatus. Thus, high color reproducibility is achieved by adjusting the deviation between the human eyes and the output of the pixels. While processing includes white balance and color matrix, as major techniques for the color adjusting, a major technique for adjusting sensitivity to wavelength is to perform color matrix processing to an output signal.

For example, in a solid-state image capturing apparatus for outputting RGB signals, by color matrix processing, the RGB image-capturing signals (sensor output) of the solid-state image capturing apparatus are multiplied by a 3×3 determinant as the following formula (1) for conversion to become RGB signals for display for display apparatuses and copying machines.

$$\begin{pmatrix} R: \text{display} \\ G \text{ display} \\ B \text{ display} \end{pmatrix} = \begin{pmatrix} M_{R \to R} & M_{G \to R} & M_{B \to R} \\ M_{R \to G} & M_{G \to G} & M_{B \to G} \\ M_{R \to B} & M_{G \to B} & M_{B \to B} \end{pmatrix} \begin{pmatrix} R \text{ image-capturing} \\ G \text{ image-capturing} \\ B \text{ image-capturing} \end{pmatrix} \quad (1)$$

In the color matrix processing, a display signal consisting of R display, G display and B display is normally given by multiplying an RGB image-capturing signal of the sensor output consisting of R image-capturing, G image-capturing and B image-capturing by a 3×3 determinant, as the formula (1) above.

The one added to the same color, such as $M_{R \to R}$, is referred to as a diagonal component, and the one added to a different color, such as $M_{R \to G}$, is referred to as a non-diagonal component. The diagonal component is 1 or greater, and normally, most of non-diagonal components have a negative value.

Hereinafter, an explanation will be provided with a solid-state image capturing apparatus which outputs RGB signals; however, application can also be made to a solid-state image capturing apparatus which captures an image of complementary colors of the ROB signals.

FIG. 9 is a flowchart schematically illustrating an image processing operation of a conventional solid-state image capturing apparatus.

As illustrated in FIG. 9, after the performance of A/D conversion processing on an image-capturing signal from an image capturing sensor (step S101), various kinds of signal processing, such as black level, white balance, color interpolation and noise reduction, are performed (step S102). Further, after the performance of color matrix processing (step S103), signal processing such as contrast emphasizing and γ correction processing is performed (step S104).

In such a conventional manner, only the same color matrix processing is multiplied to the entire output signal of an image.

It becomes difficult for a human to sense colors when it gets dark, and such a human sees a view with fewer colors. However, in such a degree of brightness, although such a view appears to a human with less color, the same colors are added with the same color matrix as a photopic vision. This causes, not only decrease in the color reproducibility, but also increase in noise due to forcibly added colors.

In order to maintain the color reproducibility, it is necessary to adjust the non-diagonal component of the color matrix appropriately. In doing so, it is known that the color reproducibility can be increased by using the color matrix in accordance with the brightness of a light source or a subject. This fact is described in Reference 1.

FIG. 10 is a block diagram illustrating an exemplary structure of an image processing circuit of a conventional CCD solid-state image capturing apparatus disclosed in Reference 1.

As illustrated in FIG. 10, in an image processing circuit 101 of a conventional CCD solid-state image capturing apparatus 100, an analog pixel signal (CCD input) for one frame, which is read out from an image capturing sensor, is input into a first stage signal processing circuit 102. The first stage signal processing circuit 102 is provided with a pre-amplifier, a band restricting video filter and the like, and the analog pixel signal to be input is sample-held and predetermined signal processing, such as amplification processing, is performed thereon.

The analog pixel signal processed in the first stage signal processing circuit 102 is converted into a digital pixel signal by an analog/digital (A/D) converter 103, and the digital pixel signal is input into a color dividing circuit 104. In the color dividing circuit 104, color dividing processing is performed on the digital pixel signal having respective color components of color chip filters of complementary colors, the digital pixel signal being converted into an RGB signal consisting of respective colors of red (R), green (G) and blue (B). The RGB signal is input into a color matrix circuit 105 from the color dividing circuit 104.

In the color matrix circuit 105, arithmetic processing for multiplying a predetermined matrix coefficient is performed on the ROB signal divided in the color dividing circuit 104, so that the signal is converted into an ROB signal having an appropriate color balance. The ROB signal provided with the arithmetic processing by the color matrix circuit 105 is stored in an image memory 106.

The RGB signal stored in the image memory 106 is read out as appropriate and is input into a latter stage signal processing circuit 107. The latter stage signal processing circuit 107 has a color balance amplifier. By the color balance amplifier, the color balance of the RGB signal is converted based on white balance data being input from a system controller 112. Further, in the latter stage signal processing circuit 107, image processing, such as clamp, γ correction, contour emphasizing and character impose, is performed on the RGB signal with a converted color balance. The RGB signal on which the image processing has been performed by the latter stage signal processing circuit 107 is converted into an analog signal by a digital/analog (D/A) converter 108. The analog RGB signal goes through video signalizing processing in an output control section 109 having a cable driver and an encoder, and is sent to a TV monitor. Thereby, an image of a subject captured by a color CCD is reproduced on a display of a TV monitor.

The RGB signal stored in the image memory 106 is also output to a light adjustment controlling section 110. In the light adjustment controlling section 110, a luminance signal is generated from the RGB signal. Further, based on the luminance signal, a light adjustment control signal I used for light amount adjustment of illumination light is calculated. The light adjustment control signal I is obtained by calculating an average value of luminance signals of all the pixels constituting an effective area displayed on a display of a TV monitor of an image capturing area of a CCD image sensor, and a peak value of luminance signals of pixels constituting a center area of the effective area, and by weighting respective values.

The light adjustment control signal I calculated by the light adjustment controlling section 110 is output to a light adjustment section 111. In the light adjustment section 111, a lens opening is driven based on the light adjustment control signal I to adjust the amount of light passing through the lens opening. As a result, the amount of white light, which is output from a light source section and enters an incident end surface of a light guide, is adjusted. Thereby, the image of the subject reproduced on a display of a TV monitor has the most appropriate luminance. The light adjustment control signal I is also output to a system controller 112, and is used for processing of converting a color matrix coefficient, which will be described later.

As such, the light adjustment control signal I from the light adjustment controlling section 110 is obtained by the system controller 112 and a color matrix coefficient is selected in accordance with the luminance of a subject. This will be explained with reference to FIG. 11.

FIG. 11 is a flowchart illustrating processing procedures of a color conversion adjustment by the system controller 112 in FIG. 10.

As illustrated in FIG. 11, color conversion is performed in a color matrix circuit 105 using a default color coefficient, and a light adjustment control signal I is calculated in the light adjustment controlling section 110 based on the image signal after the conversion. The light adjustment control signal I calculated in the light adjustment controlling section 110 is input (step S1), and thereafter, advancing to the processing of step S2, the light adjustment control signal Z is compared with a predetermined threshold. This threshold is set at a level, at which it is not problematic to determine that a subject image is more bright than usual when the light adjustment control signal I is more than the threshold and the image reproduced on a display of a TV monitor becomes highly bright. For example, a maximum high luminance value at which a subject image does not cause halation is determined as a threshold, for a reason to be described later.

When the light adjustment control signal T is smaller than the threshold at the processing in step S2, that is, when a subject image is not highly bright, the procedure advances to the processing in step S3. In step S3, a first color matrix coefficient is selected. On the other hand, when the light adjustment control signal I is larger than the threshold at the processing in step S2, that is, when a subject image is highly bright, the procedure advances to the processing in step S4. In step S4, a second color matrix coefficient is selected. In the first and second color matrix coefficient α, a value of at least one element (e.g., element a21) in a matrix as shown in the following formula (2) is different from each other. That is, the first color matrix coefficient is defined as the one corresponding to standard coloring (normal coloring), and the second color matrix coefficient, in which at least one element value is different from the first color matrix coefficient, is determined such that the coloring of the subject image changed in the threshold is corrected to the standard coloring. A specific manner for determining a second color matrix coefficient will be described later.

$$\alpha = \begin{bmatrix} a11 & a12 & a13 \\ a21 & a22 & a23 \\ a31 & a32 & a33 \end{bmatrix} \quad (2)$$

$$\begin{bmatrix} R \\ G \\ B \end{bmatrix} = \alpha \begin{bmatrix} R' \\ G' \\ B' \end{bmatrix} \quad (3)$$

Upon selection of a color matrix coefficient at step S3 or S4, the procedure advances to step S5, and a control instruction for instructing to execute arithmetic processing by the formula (3) described above using the selected color matrix coefficient α is output to the color matrix circuit 105.

In the color matrix circuit 105, the conversion processing of the RGB signal is performed based on the formula (3). In the formula (3), R' indicates a red color after color division, G' indicates a green color after color division, and B' indicates a blue color after color division. R indicates a red color after color conversion, G indicates a green color after color conversion, and B indicates a blue color after color conversion. Further, α is a color matrix coefficient, which is a matrix consisting of 3×3 elements as represented by the aforementioned formula (2).

Reference 1: Japanese Laid-Open Publication No. 2004-194993

SUMMARY OF THE INVENTION

In the conventional solid-state image capturing apparatus disclosed in Reference 1, a color matrix is changed to increase color reproducibility using the light adjustment control signal I, which changes in accordance with the change in the brightness of a light source or a subject, when the brightness of the light source or subject becomes dark. However, even in such a case, the same color matrix processing is given to the entire output signal of one image. When a bright portion of the image is detected and the color matrix is multiplied, the color reproducibility is increased. In a dark portion of the image, on the other hand, there is no color loss, which is disadvantageous for it does not match a human's sense of sight and the noise increases in the dark portion of the image.

When the value of a non-diagonal component of a color matrix increases towards a negative value, it causes amplification of noise. However, when the value of a non-diagonal component of a color matrix increases towards a positive value so as not to amplify noise, it becomes problematic such that the color fades and the color reproducibility is decreased.

The present invention is intended to solve the conventional problems described above. The objective of the present invention is to provide a signal processing apparatus and a signal processing method, capable of increasing color reproducibility to match a human's sense of sight as well as reducing noise to improve S/N; a solid-state image capturing apparatus for performing a photoelectric conversion on and capturing an image of image light from a subject, using the signal processing apparatus and the signal processing method; an electronic information device, such as a camera-equipped cell phone device, which electronic information device includes the solid-state image capturing element as an image input device used in an image capturing section thereof; a control program in which processing procedures for allowing a computer to execute each of the steps of the signal processing method are described; and a computer-readable storage medium storing the control program.

A signal processing apparatus according to the present invention is provided, for processing pixel signals corresponding to a plurality of respective pixels, the signal processing apparatus comprising a color matrix section for detecting brightness of the pixel and performs color adjustment on the pixel signals using a color matrix in accordance with the detected brightness of the pixel, thereby achieving the objective described above.

Preferably, in a signal processing apparatus according to the present invention, the signal processing apparatus performs color matrix processing on a photopic vision pixel of an image, using a predetermined color matrix for photopic vision, and starts the color matrix section to perform color matrix processing on a scotopic vision pixel of the image, using a color matrix for scotopic vision.

Still preferably, in a signal processing apparatus according to the present invention, the color matrix section includes: a light amount comparing unit for detecting brightness of the pixel to compare the detected brightness and a predetermined threshold; a color matrix preparing section for preparing a color matrix such that at least one non-diagonal component of the color matrix increases in accordance with the decrease in the predetermined threshold of the detected brightness; and a coloring section for multiplying the prepared color matrix by an output pixel signal, for each pixel, for each plurality of pixels, or for each one or plurality of pixels sampled from a plurality of pixels, to perform color adjustment.

Still preferably, in a signal processing apparatus according to the present invention, the light amount comparing unit includes: a light amount detecting section for detecting brightness of the pixel as a signal amount based on the pixel signal; and a light amount comparing section for comparing the detected signal amount with a predetermined threshold.

Still preferably, in a signal processing apparatus according to the present invention, the light amount detecting section detects a signal amount for the each pixel, for the each plurality of pixels, or for the each one or plurality of pixels sampled from a plurality of the pixels.

Still preferably, in a signal processing apparatus according to the present invention, the light amount detecting section detects a signal amount from a pixel signal of a pixel with the limitation of one or more colors, for the each pixel, for the each plurality of pixels, or for the each one or plurality of pixels sampled from a plurality of the pixels.

Still preferably, in a signal processing apparatus according to the present invention, the one or more colors are at least either green (G) or blue (S).

Still preferably, in a signal processing apparatus according to the present invention, the light amount comparing unit includes: a dedicated light amount detecting section for dedicatedly detecting brightness of the pixel as a signal amount; and a light amount comparing section for comparing the signal amount dedicatedly detected by the dedicated light amount detecting section with a predetermined threshold.

Still preferably, in a signal processing apparatus according to the present invention, the light amount comparing unit includes: a light amount detecting section for detecting brightness of the pixel based on a shutter time which changes in accordance with the brightness of the pixel; and a light amount comparing section for comparing the detected shutter time with a predetermined threshold.

Still preferably, in a signal processing apparatus according to the present invention, the light amount comparing unit includes: a light amount detecting section for detecting brightness of the pixel based on a gain value which changes in accordance with the brightness of the pixel; and a light amount comparing section for comparing the detected gain value with a predetermined threshold.

Still preferably, in a signal processing apparatus according to the present invention, the light amount comparing unit includes: a light amount detecting section for detecting brightness of the pixel based on a lens opening; and a light amount comparing section for comparing the detected lens opening with a predetermined threshold.

Still preferably, in a signal processing apparatus according to the present invention, the light amount comparing unit monitors the shutter time, and determines that it is scotopic vision when the shutter time is at or more than a predetermined time length as a threshold, and determines that it is photopic vision when the shutter time is less than the predetermined time length as a threshold.

Still preferably, in a signal processing apparatus according to the present invention, the light amount comparing unit monitors the gain value, and determines that it is scotopic vision when the gain value is at or more than a predetermined rate as a threshold, and determines that it is photopic vision when the gain value is less than the predetermined rate as a threshold.

Still preferably, in a signal processing apparatus according to the present invention, the light amount comparing unit monitors the lens opening, and determines that it is scotopic vision when the lens opening is at or more than a predetermined value as a threshold, and determines that it is photopic vision when the lens opening is less than the predetermined value as a threshold.

Still preferably, in a signal processing apparatus according to the present invention, the light amount comparing section sets that it is photopic vision when luminous intensity of a subject in the light amount detecting section is 30 lux or more or 100 lux or more, or a signal amount is 5 candela or more or 30 candela or more as the brightness, and the light amount comparing section sets that it is scotopic vision when the luminous intensity of the subject in the light amount detecting section is less than 30 lux or less than 100 lux, or the signal amount is less than 5 candela or 30 candela.

Still preferably, in a signal processing apparatus according to the present invention, the light amount detecting section obtains brightness of the pixel by detecting a signal amount from a luminance signal and weighting the signal amount in accordance with a color of the pixel and then summing up each signal amount with different colors or taking an average value among the different colors.

Still preferably, in a signal processing apparatus according to the present invention, the light amount detecting section obtains the signal amount using luminance signal Y1=0.3R+0.6G+0.1B, in the case of photopic vision, and obtains the signal amount by using luminance signal Y2=0.5G+0.5B, in the case of scotopic vision.

Still preferably, a signal processing apparatus according to the present invention further includes an A/D conversion circuit for converting an analog signal of the pixel signal into a digital signal, at a prior stage of the color matrix section.

Still preferably, in a signal processing apparatus according to the present invention, a noise reduction section is provided in between the A/D conversion circuit and the color matrix section, and the noise reduction circuit outputs a pixel signal after noise reduction to the light amount comparing unit and the coloring section.

Still preferably, in a signal processing apparatus according to the present invention, a non-diagonal component of at least one color of the color matrix for scotopic vision is positive, and a diagonal component of the one color also includes at least one component of 1 or less.

Still preferably, in a signal processing apparatus according to the present invention, the color matrix for scotopic vision increases a coefficient relating to an output pixel signal of blue and green and decreases a coefficient relating to an output pixel signal of red, with respect to the color matrix for photopic vision.

Still preferably, in a signal processing apparatus according to the present invention, two types or more of the color matrices for photopic vision and scotopic vision are used in accordance with the type of light source.

Still preferably, in a signal processing apparatus according to the present invention, the color matrix preparing section includes: a first color matrix preparing section for preparing the color matrix for scotopic vision such that a non-diagonal component of the color matrix increases when the light amount comparing unit determines that the signal amount is less than a threshold; and a second color matrix preparing section for preparing the color matrix for photopic vision when the light amount comparing unit determines that the signal amount is at or more than the threshold.

Still preferably, in a signal processing apparatus according to the present invention, the color matrix preparing section includes: a first color matrix preparing section for preparing the color matrix for scotopic vision such that a non-diagonal component of the color matrix increases when the light amount comparing unit determines that the shutter time is at or more than a threshold; and a second color matrix preparing section for preparing the color matrix for photopic vision when the light amount comparing unit determines that the shutter time is less than the threshold.

Still preferably, in a signal processing apparatus according to the present invention, the color matrix preparing section includes: a first color matrix preparing section for preparing the color matrix for scotopic vision such that a non-diagonal component of the color matrix increases when the light amount comparing unit determines that the gain value is at or more than a threshold; and a second color matrix preparing section for preparing the color matrix for photopic vision when the light amount comparing unit determines that the gain value is less than the threshold.

Still preferably, in a signal processing apparatus according to the present invention, the color matrix preparing section includes: a first color matrix preparing section for preparing the color matrix for scotopic vision such that a non-diagonal component of the color matrix increases when the light amount comparing unit determines that the lens opening is at or more than a threshold; and a second color matrix preparing section for preparing the color matrix for photopic vision when the light amount comparing unit determines that the lens opening is less than the threshold.

Still preferably, in a signal processing apparatus according to the present invention, as an increase in a non-diagonal component of the color matrix, the color matrix section increases the non-diagonal component towards a positive value.

Still preferably, in a signal processing apparatus according to the present invention, the color matrix preparing section prepares the color matrix by defining each component of the color matrix as a function f(x), and the brightness value is substituted for x.

Still preferably, in a signal processing apparatus according to the present invention, the color matrix preparing section prepares the color matrix by weighting in accordance with the brightness on the basis of the color matrix for photopic vision and the color matrix for scotopic vision.

Still preferably, in a signal processing apparatus according to the present invention, the weighting changes linearly with respect to the brightness, as the following formula: color matrix=$(1-x)$ (color matrix for scotopic vision)+$x$ (color matrix for photopic vision).

Still preferably, in a signal processing apparatus according to the present invention, the weighting changes with respect to the brightness, as the following exponential function $e^x$: color matrix=$(1-e^x)$ (color matrix for scotopic vision)+$e^x$ (color matrix for photopic vision)$_o$ Still preferably, in a signal processing apparatus according to the present invention, the weighting changes by a sigmoid function as in the following formula, where an output with respect to a logarithmic value of the brightness is different for the color matrix for photopic vision and the color matrix for scotopic vision: color matrix=$1/\{1+\exp(x)\}$(color matrix for scotopic vision)+$1/\{1+\text{ext}(-x)\}$(color matrix for photopic vision).

Still preferably, in a signal processing apparatus according to the present invention, the color matrix preparing section takes an average value of pixel signal values of both ends of three adjacent pixels where a color matrix changes in photopic vision and scotopic vision to obtain a middle pixel signal value, so that the color matrix preparing section can change the color matrix such that the color matrix is changed to increase or decrease successively.

Still preferably, in a signal processing apparatus according to the present invention, the color matrix preparing section is provided with a storing section for storing in advance a predetermined color matrix used during photopic vision, and the color matrix preparing section performs processing using the color matrix in the storing section during photopic vision.

Still preferably, in a signal processing apparatus according to the present invention, one color matrix or a plurality of color matrices used during scotopic vision in accordance with brightness are stored in advance in the storing section, and the color matrix preparing section reads out the color matrix for scotopic vision to set a color matrix.

Still preferably, in a signal processing apparatus according to the present invention, a switch section for forcibly determining that it is scotopic vision, is provided externally.

Still preferably, in a signal processing apparatus according to the present invention, the color matrix in accordance with the detected brightness of the pixel is color matrices for photopic vision and scotopic vision in accordance with the brightness of the pixel.

Still preferably, in a signal processing apparatus according to the present invention, the color matrix for scotopic vision is one color matrix or a plurality of color matrices in accordance with the brightness of the pixel.

A solid-state image capturing apparatus according to the present invention is provided, for performing color matrix processing and color adjustment processing, using the signal processing apparatus according to the present invention, wherein the solid-state image capturing apparatus is provided with a plurality of light receiving sections for performing a photoelectric conversion on and capturing an image of image light from an image-capturing subject, as the plurality of pixels, thereby achieving the objective described above.

An electronic information device according to the present invention is provided, using the solid-state image capturing apparatus according to the present invention, as an image input device, in an image capturing section thereof thereby achieving the objective described above.

A signal processing method according to the present invention is provided, for processing pixel signals corresponding to a plurality of respective pixels, comprising a color matrix step, in which a color matrix section detects brightness of the pixels and performs color adjustment processing on the pixel signals using a color matrix in accordance with the detected brightness of the pixel, thereby achieving the objective described above.

Preferably, in a signal processing method according to the present invention, the color matrix step includes: a light amount comparing step of a light amount comparing unit detecting brightness of the pixel to compare the detected brightness with a predetermined threshold; a color matrix preparing step of a color matrix preparing section preparing a color matrix such that at least one non-diagonal component of the color matrix increases in accordance with the decrease in the detected brightness from the predetermined threshold; and a coloring step of a coloring circuit multiplying the prepared color matrix by an output pixel signal for the each pixel, for the each plurality of pixels, or for each one pixel or each plurality of pixels sampled from a plurality of pixels, to perform color adjustment.

A control program according to the present invention is provided, in which processing procedures for allowing a computer to execute each of the steps of the signal processing method according to the present invention are described, thereby achieving the objective described above.

A computer-readable storage medium according to the present invention is provided, in which the control program according to the present invention is stored, thereby achieving the objective described above.

The functions of the present invention having the structures described above will be described hereinafter.

According to the present invention, the signal processing apparatus for processing pixel signals corresponding to a plurality of respective pixels includes a color matrix section for detecting the brightness of a pixel and performs color adjustment processing on a pixel signal using a color matrix in accordance with the brightness of the detected pixel. A predetermined photopic vision color matrix is used to perform color matrix processing on a photopic vision pixel of an image, and the color matrix section is started and a scotopic vision color matrix is used to perform color matrix processing on a scotopic vision pixel of the image.

As such, the color matrix section for detecting the brightness of a pixel and performing color adjustment processing on a pixel signal using a color matrix in accordance with the brightness of the detected pixel is provided, so that it becomes possible to use the most appropriate color matrix in accordance with the brightness of each position (each pixel position) of an image-capturing subject, which is one image. Thereby, color reproducibility is increased to match a human's sense of sight and noise is reduced to improve S/N.

According to the present invention as described above, the most appropriate color matrix is used in accordance with the brightness of each position (each pixel position) of an image-capturing subject, which is one image. Therefore, color reproducibility is increased to match a human's sense of sight and noise is reduced to improve S/N.

These and other advantages of the present invention will become apparent to those skilled in the art upon reading and understanding the following detailed description with reference to the accompanying figures.

Figure 1:
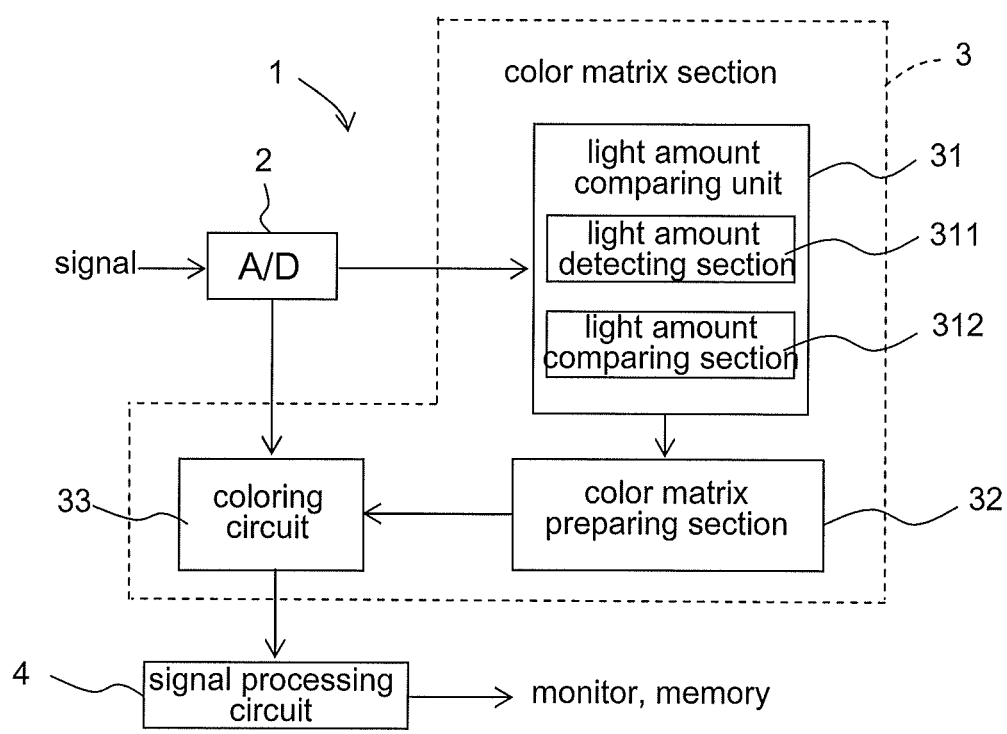
FIG. 1 is a block diagram illustrating an exemplary essential part structure of a solid-state image capturing apparatus according to Embodiment 1 of the present invention.

1, 1A, 1B, 1C, 1D, 1E solid-state image capturing apparatus
2 A/D conversion circuit
3, 3A, 3B, 3C, 3D, 3E color matrix section
31, 31B, 31C, 31D, 31E light amount comparing unit
311, 311B, 311C, 311D, 311E light amount detecting section 312 light amount comparing section
32 color matrix preparing section
321 first color matrix preparing section
322 second color matrix preparing section
33 coloring circuit
4 signal processing circuit
4B second signal processing circuit
5 noise reduction circuit
5B first signal processing circuit
90 electronic information device
91 memory section
92 display section
93 communication section
94 image output section

DESCRIPTION OF THE PREFERRED EMBODIMENTS

Hereinafter, Embodiments 1 to 3 will be described in detail with reference to the accompanying figures, where the signal processing apparatus of the present invention is applied to a solid-state image capturing apparatus. Further, Embodiment 4 of an electronic information device such as a camera-equipped cell phone device will be described in detail with reference to the accompanying figures, where any of Embodiments 1 to 3 of the solid-state image capturing apparatus is used as an image input device in an image capturing section thereof.

(Embodiment 1)

FIG. 1 is a block diagram illustrating an exemplary essential part structure of a solid-state image capturing apparatus according to Embodiment 1 of the present invention.

In FIG. 1, a solid-state image capturing apparatus 1 according to Embodiment 1 includes: an A/D conversion circuit 2 for performing A/D conversion on a pixel signal obtained by performing predetermined analog signal processing on an image-capturing signal (pixel signal corresponding to each of a plurality of pixels), the image-capturing signal being from a solid-state image capturing element (not shown) provided with a plurality of light receiving sections as a plurality of pixel sections for performing a photoelectric conversion on and capturing an image of image light from an image-capturing subject (one image); a color matrix section 3 for performing color adjustment using a color matrix in accordance with brightness of each screen position of the image-capturing subject; and a signal processing circuit 4 for performing various types of signal processing other than color matrix processing on an output signal from the color matrix section 3. The signal processing apparatus according to Embodiment 1 is constituted of the color matrix section 3.

The color matrix section 3 includes: a light amount comparing unit 31 for detecting, as a signal amount, brightness of an image-capturing subject for each pixel from a pixel signal obtained by performing predetermined analog signal processing on an image-capturing signal from a solid-state image capturing element (not shown) provided with a plurality of light receiving sections as a plurality of pixel sections for performing a photoelectric conversion on and capturing an image of image light from an image-capturing subject, and comparing the detected signal amount with a predetermined threshold; a color matrix preparing section 32 for preparing a color matrix such that at least one non-diagonal component of the color matrix increases (non-diagonal component becomes larger towards the positive value) in accordance with the decrease in the signal amount detected; and a coloring circuit 33 performing as a coloring section for multiplying the prepared color matrix successively by the output signal for each pixel from the A/D conversion circuit 2 to perform color adjustment for each pixel of one image.

The light amount comparing unit 31 includes: a light amount detecting section 311 for detecting brightness of an image-capturing subject (brightness of a pixel), as a detected signal amount, based on an image-capturing signal (pixel signal) from a light receiving section; and a light amount comparing section 312 for comparing the detected signal amount with a predetermined threshold.

The light amount detecting section 311 detects a signal amount for each pixel, and moreover, the light amount detecting section 311 may detect a signal amount for each plurality of pixels or may detect a signal amount for one or a plurality of pixels sampled from a plurality of pixels. In this case, the signal amount is detected from a pixel signal of pixels limited with one or more colors. The one or more colors may be at least either green (G) or blue (e) without red (R) since it is scotopic vision. Thanks to this, it is possible to be closer to a human's eyesight.

As brightness, when luminous intensity of a subject in the light amount detecting section 311 is 30 lux or more or 100 lux or more, or a signal amount is 5 candela or more or 30 candela or more, the light amount comparing section 312 determines that it is photopic vision; and when luminous intensity of the subject is less than 30 lux or 100 lux, or the signal amount is less than 5 candela or 30 candela, the light amount comparing section 312 determines that it is scotopic vision.

The light amount detecting section 311 obtains brightness of a pixel (or brightness of each position of an image-capturing subject) by detecting signal amounts from a luminance signal and weighting the signal amounts of the luminance signal in accordance with the color of each pixel (or light receiving section) and then summing them up with different colors or taking an average value among the different colors. That is, in the case of photopic vision, the signal amount is obtained by using luminance signal $Y1=0.3R+0.6G+0.1B$, and in the case of scotopic vision the signal amount is obtained by using luminance signal $Y2=0.5G+0.5B$.

With the structure described above, an operation of the solid-state image capturing apparatus 1 according to Embodiment 1 will be described.

Figure 2:
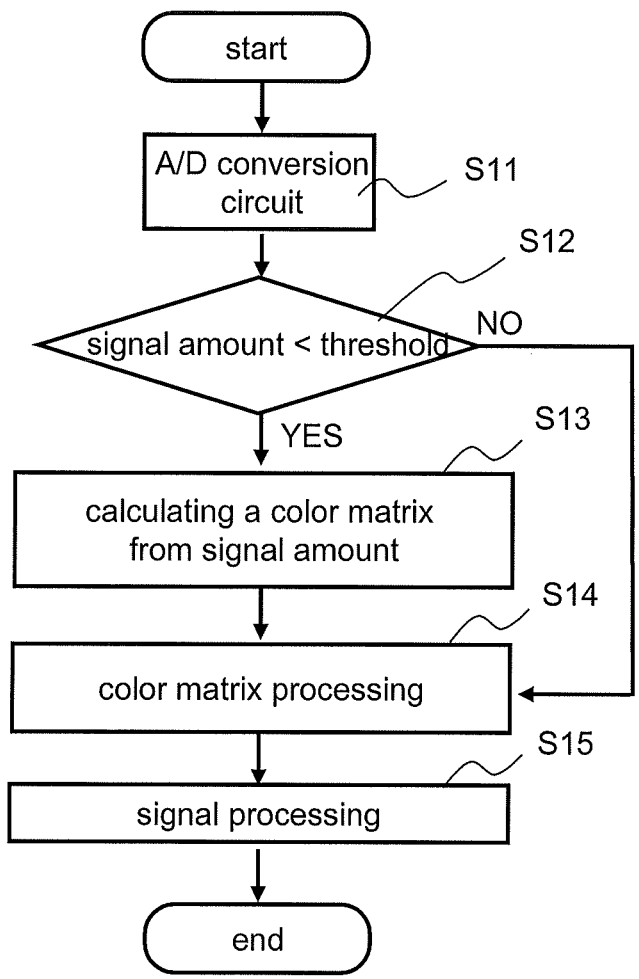
FIG. 2 is a flowchart for describing an operation of the solid-state image capturing apparatus 1 of FIG. 1.

FIG. 2 is a flowchart for describing an operation of the solid-state image capturing apparatus 1 of FIG. 1.

As illustrated in FIG. 2, first, the A/D conversion circuit 2 performs A/D conversion on a pixel signal and outputs a digital pixel signal (Step S11), where the pixel signal is obtained by performing predetermined analog signal processing on an image-capturing signal, the image-capturing signal being from a solid-state image capturing element (not shown) provided with a plurality of light receiving sections as a plurality of pixel sections for performing a photoelectric conversion on and capturing an image of image light from an image-capturing subject (one image).

Next, the light amount detecting section 311 detects the brightness of the image-capturing subject as a signal amount, based on the digital pixel signal obtained by A/D conversion on the image-capturing signal (pixel signal) from each light receiving section. Then, the light amount comparing section 312 compares the detected signal amount with a predetermined threshold (Step S12).

Thereafter, the color matrix preparing section 32 prepares a color matrix such that at least one non-diagonal component of the color matrix increases in accordance with the decrease in the signal amount detected, as a comparative result of the light amount comparing section 312 (step S13).

Subsequently, the coloring circuit 33 successively multiplies the color matrix prepared by the color matrix preparing section 32 by the output signal for each pixel from the A/D conversion circuit 2 to perform color adjustment on one image for each pixel section (Step S14).

In this case, the color matrix section 3 performs color matrix processing at step S14 using a predetermined color matrix for photopic vision with respect to a photopic vision pixel of an image (NO at step S12). The color matrix section 3 also starts the color matrix preparing section 32 in the color matrix section 3 to prepare a color matrix for scotopic vision with respect to a scotopic vision pixel of an image (YES at step S12), and uses the color matrix to perform color matrix processing at step S14. That is, in the case of a photopic vision pixel of an image (NO at step S12), a color matrix for photopic vision is stored regularly in a storage section in the color matrix preparing section 32, and the color matrix is read out to perform color matrix processing at step S14. In the case of scotopic vision pixel of an image (YES at step S12), at step S13, the color matrix preparing section 32 prepares a color matrix for scotopic vision such that at least one non-diagonal component of the color matrix increases in accordance with the decrease in the signal amount detected.

Further, the signal processing circuit 4 performs various types of signal processing such as black level, white balance, color interpolation, noise reduction, contrast emphasizing and γ correction on an output image signal from the coloring circuit 33, as signal processing other than color matrix processing (step S15). A color image signal outputted from the signal processing circuit 4 is processed in a predetermined signal processing manner for display and is then displayed on a screen of a monitor as a display section. Alternatively, the image signal is processed in a predetermined signal processing manner (e.g., compression signal processing) for storing and is then stored in a memory as a storing section. The signal processing by the signal processing circuit 4 may be provided between the A/D conversion circuit 2 and the coloring circuit 33.

The color matrix section 3 according to Embodiment 1 may be configured by software instead of hardware as described previously.

A signal processing method according to Embodiment 1 includes a color matrix step, in which the color matrix section 3 detects brightness of a pixel and performs color adjustment processing on a pixel signal using a color matrix in accordance with the brightness of the detected pixel. The color matrix step includes a light amount comparing step of the light amount comparing unit 31 detecting brightness of a pixel to compare the detected brightness with a predetermined threshold; a color matrix preparing step of the color matrix preparing section 32 preparing a color matrix such that at least one non-diagonal component of the color matrix increases in accordance with the decrease in the detected brightness from the predetermined threshold; and a coloring step of the coloring circuit 33 multiplying the prepared color matrix by an output pixel signal for any of each pixel, each plurality of pixels, and one or a plurality of pixels sampled from a plurality of pixels to perform color adjustment.

As a structure for achieving the above matter, the solid-state image capturing apparatus 1 according to Embodiment 1 includes: a CPU (Central Processing Unit) as a control section for the overall controlling; an operation section such as a keyboard and a mouse for inputting an instruction to the CPU as well as an input device for reception and input via a communication network (e.g. Internet or Intranet); a display section for displaying an initial screen, a selection screen, a control result screen by the CPU, an operation input screen and the like on a display screen; a ROM as a computer readable storage medium, in which a control program and data thereof are stored; and a RAM as a storing section functioning as work memory for reading and storing data for each control by the CPU.

The ROM as a readable storage medium may be constituted of a mobile form such as an optical disc, a magneto-optical disc, a magnetic disc and IC memory, in addition to hard disk. The control program and data thereof are stored in a ROM, and such control program and data may be downloaded from another readable storage medium or via wireless or wire or via Internet or the like to the ROM.

Hereinafter, the principle of the present invention and the specific operation of the solid-state image capturing apparatus 1 will be further described in detail.

The human eyes gradually lose the ability to sense colors when luminous intensity from a subject gets darker than about 30 lux or 100 lux (where the luminous intensity range is wider than 30 lux). This is because the human eyes switch from the photopic vision to the scotopic vision. Rods are cells that are active in scotopic vision and are distributed with respect to a field of vision, and sense brightness but not color. By changing a ratio, rods transit from cone cells of red, green and blue, which are active in photopic vision. Therefore, in a dark place, where rods are active, the sight looks as if the colors are gradually removed.

In one image, when color adjustment is made with a color matrix with high color reproducibility in a bright place, the deviation becomes larger in a dark place between the sight a human sees and the output from the solid-state image capturing apparatus 1. However, changing of the color matrix has not been done at a bright place and a dark place in one image. Therefore, in the present invention, a section for detecting brightness for each pixel (light amount detecting section 311) is provided to perform color adjustment such that a color matrix becomes most appropriate for a dark place.

As in the formula (4) below, A with a negative value is added to a diagonal component in the formula (1) above, and E with a positive value is added to a non-diagonal component in the formula (1) above, so that the color is removed.

In the color matrix preparing section 32, a color matrix is prepared such that at least one non-diagonal component of the color matrix increases (non-diagonal component becomes larger towards the positive value) in accordance with the decrease in the signal amount detected in scotopic vision.

$$\begin{pmatrix} R \text{ display} \\ G \text{ display} \\ B \text{ display} \end{pmatrix} = \begin{pmatrix} M_{R \to R} + A_{R \to R} & M_{G \to R} + E_{G \to R} & M_{B \to R} + E_{B \to R} \\ M_{R \to G} + E_{R \to G} & M_{G \to G} + A_{G \to G} & M_{B \to G} + E_{B \to G} \\ M_{R \to B} + E_{R \to B} & M_{G \to B} + E_{G \to B} & M_{B \to B} + A_{B \to B} \end{pmatrix} \quad (4)$$

$$\begin{pmatrix} R \text{ image capturing} \\ G \text{ image capturing} \\ B \text{ image capturing} \end{pmatrix}$$

Here, normally, the sum of the color matrix in a transverse row does not change before and after adding the A and E. For example, the following formula (5) is established for the top row.

$$M_{R \to R} + A_{R \to R} + M_{G \to R} + E_{G \to R} + M_{B \to R} + E_{B \to R} = M_{R \to R} + M_{G \to R} + M_{B \to R} \quad (5)$$

In addition, when white balance is appropriate, the sum of the color matrix in a transverse row becomes 1.

For example, the following formula (6) is established for the top row.

$$M_{R \to R} + M_{G \to R} + M_{B \to R} = 1 \quad (6)$$

Since the human eyes' ability to sense colors decreases in a dark place, provision of the processing described above to the A in the diagonal component and the E in the non-diagonal component in the same row makes it closer to the characteristics of the human eyes. As a result, non-diagonal elements of the color matrix can be increased and noise can be reduced. Herein, the non-diagonal component normally has a negative value, but it is also possible to perform color adjustment so as to have a positive value, which further increases the effect of reducing noise.

Further, as the human eyes shift to scotopic vision, the peak position of the wavelength for sensing the sensitivity shifts from around 550 nm to around 500 nm. In particular, the sensitivity for red is known to decrease.

Accordingly, when it is explained with the R display as an example in the formula (1) above, the positive value of $M_{R \to R}$, at the top of the first row is decreased towards zero and the next and further next $M_{G \to R}$ and $M_{B \to R}$ in the first row are increased from the negative value to the positive value. Similarly, when $M_{R \to G}$ and $M_{R \to B}$ are decreased, and $M_{G \to G}$, $M_{G \to G}$, $M_{G \to B}$, and $M_{B \to B}$ are increased, the deviation of the peak of the sensitivity wavelength between the rods and cones can be expressed, and further, noise can be normally reduced.

Suppose it is at the brightness in the middle of photopic vision and scotopic vision (i.e., twilight vision: luminous intensity is, for example, 30 lux to 100 lux, and the brightness is at the middle of the three levels). When someone looks at a subject in an image, where apart thereof is bright and another part thereof is dark, the human eyes can recognize the color of the bright part, but it may be difficult to recognize the color of the dark part being viewed at the same time. Accordingly, by changing a color matrix depending on the corresponding brightness of the subject for each pixel or each plurality of pixels, it becomes possible to display an image with high color reproducibility of the dark place with conspicuous noise as well as to reduce the noise, while maintaining clear coloring of the bright place.

Hereinafter, on the basis of the technical concept above, the operation will be described in detail.

First, the A/D conversion circuit 2 performs A/D conversion on a signal and outputs a digital pixel signal (Step S11), where the signal is obtained by performing predetermined analog signal processing on an image-capturing signal, the image-capturing signal being from a solid-state image capturing element (not shown) provided with a plurality of light receiving sections as a plurality of pixel sections for performing a photoelectric conversion on and capturing an image of image light from an image-capturing subject (one image).

Next, the light amount detecting section 311 detects the brightness or luminance of the image-capturing subject as a signal amount, based on an image-capturing signal from each light receiving section. Then, the light amount comparing section 312 compares the detected signal amount with a predetermined threshold (Step S12).

The light amount detecting section 311 appropriately detects the brightness or luminance of the image-capturing subject. An estimation of brightness or luminance from an output signal level for each pixel section is the simplest method. As a calculating method of brightness or luminance, a method for weighting as appropriate for each color of each pixel section for addition and a method for simply taking an average can be conceived.

The light amount comparing section 312 sets a threshold to be the brightness of 30 lux, for example, and compares it with the brightness of an image-capturing subject. When the brightness of the image-capturing subject is at 30 lux or more, the light amount comparing section 312 determines it as photopic vision. When the brightness of the image-capturing subject is less than 30 lux, the light amount comparing section 312 determines it as scotopic vision. The threshold may be the brightness of 50 lux or 100 lux, instead of the brightness of 30 lux. The brightness of the image-capturing subject can be obtained from an output signal level for each pixel section with the limitation of one color or more (e.g., G or B, and G and B).

Methods for calculating the luminance of the image-capturing subject from a luminance signal Y1 of a photopic vision with 30 lux or more and a luminance signal Y2 of a scotopic vision with less than 30 lux are well known in general. Thus, these methods are used for the conversion to the luminance of the image-capturing subject. That is, a luminance signal is weighted in accordance with the color of a pixel section, and thereafter, it is summed with a different color, or an average value is taken with different colors, thereby obtaining brightness.

Luminance signal of photopic vision Y1=0.3R+0.6G+0.1B
Luminance signal of scotopic vision Y2=0.5G+0.5B With the formulas above, it is said that humans can sense brightness. In the case of scotopic vision, red (R) is lost and the average value of green (G) and blue (B) is obtained.

Next, using the brightness (signal amount) calculated by the method above, a color matrix is obtained.

Fundamentally, the following formula (7) is obtained when each term (e.g., αL) of the 3×3 matrix is represented by a function (f (L), where L is a variable).

In this case, the color matrix preparing section 32 prepares a color matrix by setting each component of a color matrix as a function f(L), and substituting a brightness value for L.

$$\begin{pmatrix} R \text{ display} \\ G \text{ display} \\ B \text{ display} \end{pmatrix} = \begin{pmatrix} M_{R \to R}(L) & M_{G \to R}(L) & M_{B \to R}(L) \\ M_{R \to G}(L) & M_{G \to G}(L) & M_{B \to G}(L) \\ M_{R \to B}(L) & M_{G \to B}(L) & M_{B \to B}(L) \end{pmatrix} \begin{pmatrix} R \text{ image capturing} \\ G \text{ image capturing} \\ B \text{ image capturing} \end{pmatrix} \quad (7)$$

In the formula (7) above, in which a matrix is obtained by substituting the brightness L for the function f (L), $M_{a \to b}$ (L) is represented by a function with the L as a variable. In the following description, formulas with simple processes will be exemplified; however, the examples are not limited to those described herein.

In addition, the following formula (8) is obtained when each term of the 3×3 matrix is represented by a function f (logL) of a logarithm. As a result, the brightness can be obtained as a logarithm.

$$\begin{pmatrix} R \text{ display} \\ G \text{ display} \\ B \text{ display} \end{pmatrix} = \begin{pmatrix} M_{R \to R}(\log L) & M_{G \to R}(\log L) & M_{B \to R}(\log L) \\ M_{R \to G}(\log L) & M_{G \to G}(\log L) & M_{B \to G}(\log L) \\ M_{R \to B}(\log L) & M_{G \to B}(\log L) & M_{B \to B}(\log L) \end{pmatrix} \begin{pmatrix} R \text{ image capturing} \\ G \text{ image capturing} \\ B \text{ image capturing} \end{pmatrix} \quad (8)$$

Next, a method for obtaining a matrix as a function of M by interpolation will be exemplified. 3×3 matrices are pre-determined as a limit in photopic vision and scotopic vision. For example, the following formula (9) is for photopic vision and the following formula (10) is for scotopic vision.

$$\begin{pmatrix} B_{R \to R} & B_{G \to R} & B_{B \to R} \\ B_{R \to G} & B_{G \to G} & B_{B \to G} \\ B_{R \to B} & B_{G \to B} & B_{B \to B} \end{pmatrix} \quad (9)$$

$$\begin{pmatrix} D_{R \to R} & D_{G \to R} & D_{B \to R} \\ D_{R \to G} & D_{G \to G} & D_{B \to G} \\ D_{R \to B} & D_{G \to B} & D_{B \to B} \end{pmatrix} \quad (10)$$

The application to the formula (7) above will obtain the following formula (11).

$$\begin{pmatrix} \alpha_{R \to R}(L)B_{R \to R} + \beta_{R \to R}(L)D_{R \to R} & \alpha_{G \to R}(L)B_{G \to R} + \beta_{G \to R}(L)D_{G \to R} & \alpha_{B \to R}(L)B_{B \to R} + \beta_{B \to R}(L)D_{B \to R} \\ \alpha_{R \to G}(L)B_{R \to G} + \beta_{R \to G}(L)D_{R \to G} & \alpha_{G \to G}(L)B_{G \to G} + \beta_{G \to G}(L)D_{G \to G} & \alpha_{B \to G}(L)B_{B \to G} + \beta_{B \to G}(L)D_{B \to G} \\ \alpha_{R \to B}(L)B_{R \to B} + \beta_{R \to B}(L)D_{R \to B} & \alpha_{G \to B}(L)B_{G \to B} + \beta_{G \to B}(L)D_{G \to B} & \alpha_{B \to B}(L)B_{B \to B} + \beta_{B \to B}(L)D_{B \to B} \end{pmatrix} \quad (11)$$

In order to apply to the formula (8) above, the (L) of the formula (11) may be rewritten to (log L).

Alternatively, it is normally that $\alpha = 1 - \beta$.

As the function of $\alpha$ and $\beta$, a linear function, sigmoid function, or a function with a characteristic similar to those can be included; however, the function is not specified herein.

That is, in the color matrix preparing section 32, a color matrix can be prepared by weighting in accordance with brightness on the basis of the color matrix for photopic vision and the color matrix for scotopic vision.

The weighting changes linearly as in the following formula with respect to brightness.

Color matrix=(1−x)(color matrix for scotopic vision)+ x(color matrix for photopic vision)

In addition, the weighting may change by an exponential function $e^x$ as in the following formula with respect to brightness.

Color matrix=(1−$e^x$)(color matrix for scotopic vision)+$e^x$(color matrix for photopic vision)

Further, the weighting can be changed by a sigmoid function as in the following formula, where the output with respect to a logarithmic value of brightness is different for the color matrix for photopic vision and the color matrix for scotopic vision.

Color matrix=1/{1+exp(x)}(color matrix for scotopic vision)+1/{1+exp(−x)}(color matrix for photopic vision)

As an example, a sigmoid function will be expressed by the following formula (12), where a is an arbitrary number.

$$\alpha(L) = \frac{1}{1 + \exp(-aL)} \quad (12)$$

In addition, in the color matrix preparing section 32, there is also a method, where a part or all of the color matrix is calculated in advance, and the result is saved on a storage section (memory), and brightness is read out as a variable.

When the color matrix is calculated in advance, the color matrix becomes discrete. Thus, it is favorable to fractionate it in accordance with accuracy.

That is, the color matrix preparing section 32 can be configured to be provided with a storing section for storing in advance a predetermined color matrix used during photopic vision, so that processing is performed using the color matrix in the storing section during photopic vision.

Alternatively, for the color matrix preparing section 32, it is also possible to store one color matrix used during scotopic vision or a plurality of color matrix in accordance with brightness in the storing section, and read out the color matrix for scotopic vision to set a color matrix.

With regard to the value of the color matrix, when a diagonal component is decreased and a non-diagonal component is increased, at least a diagonal component of RGB may be 1 or less and a non-diagonal component may be zero or more.

It is also possible to include a positive non-diagonal component of at least one color of a color matrix for scotopic vision and at least one diagonal component of one color, which is 1 or less.

The color matrix for scotopic vision increases a coefficient related to output pixel signals of blue and green, and decreases a coefficient related to output pixel signals of red, with respect to the color matrix for photopic vision.

As such, the sensitivity of B and G increases in scotopic vision. Thus, in the formula (1), $M_{R \to R}$, $M_{R \to G}$ and $M_{R \to B}$ are decreased and $M_{G \to R}$, $M_{G \to G}$ and $M_{G \to B}$ as well as $M_{B \to R}$, $M_{B \to G}$ and $M_{B \to B}$ are increased, so that the characteristics become closer to those of humans.

In addition, the color reproducibility can be further increased by changing a calculation formula of color matrix or a set of color matrix in accordance with a light source.

The human eyes require some time to adapt to scotopic vision. There may be a case where it is not desirable to use a color matrix for scotopic vision because an image-capturing subject of the solid-state image capturing apparatus 1 happens to be dark overall. Thus, it is desirable to confirm the darkness to be considered as scotopic vision and force the function according to the present invention (which is to prepare a color matrix so as to increase a non-diagonal component of the color matrix during scotopic vision) to work. A manually operatable switch section may be externally provided for forced determination for scotopic vision.

In a case where a manually operatable switch section for forced determination for scotopic vision is externally provided, when a color matrix for photopic vision is used to capture an image in black at a bright place, noise of the black color is amplified and the image cannot be captured clearly. On the other hand, when a color matrix for scotopic vision is used in such a case, the image in black can be captured clearly for display.

A function for measuring or estimating brightness or luminous intensity of a light source is provided. Then, the function determines that it is scotopic vision when the brightness is below a certain brightness (threshold) to allow the function according to the present invention (which is to prepare a color matrix so as to increase a non-diagonal component of the color matrix during scotopic vision) to work. For example, since a human's sense of sight is switched to scotopic vision around 30 lx (lux; luminous intensity) or less, the threshold for determining scotopic vision may be set at 30 lx or less or at a higher value, 100 lx or less. A human's sense of sight varies and the way they sense it is also different depending on the individuals. Thus, it is not always necessary to follow the example above, but it is allowed to use discretion to determine the standard.

A method for using luminance (signal amount) of an image-capturing subject is conceivable. Then, the method determines that it is scotopic vision when the luminance is below a certain brightness (threshold) to allow the function according to the present invention (which is to prepare a color matrix so as to increase a non-diagonal component of the color matrix during scotopic vision) to work. For example, since a human's sense of sight is switched to scotopic vision around 5 cd (candela) or less, the threshold for determining scotopic vision may be set at 5 cd or less or at 30 cd or less. Similarly, it is not always necessary to follow the example above, but it is allowed to use discretion to determine the standard.

According to Embodiment 1 as described above, it becomes possible to use the most appropriate color matrix in accordance with the brightness of each position (each pixel position) of an image-capturing subject, which is one image. As a result, the color reproducibility of a bright place can be increased and noise can be reduced even at a dark place, and colors close to the human's sense of sight can be effectively produced. Further, the present invention can be carried out with a little addition of processing, so that noise can be largely reduced with a little cost.

Since it is difficult in general to measure luminance and luminous intensity, it is also possible to function the present invention (which is to prepare a color matrix so as to increase a non-diagonal component of the color matrix during scotopic vision) by setting of a shutter time or gain (e.g., feedback from set values of the solid-state image capturing apparatus 1, such as a shutter time and gain). In doing so, it is also possible to consider an overall signal amount and a partial signal amount (signal amount for each pixel). In addition, it is also possible to function the present invention (which is to prepare a color matrix so as to increase a non-diagonal component of the color matrix during scotopic vision) by the setting of lenses and in particular a lens opening. Further, it is also possible to input brightness based on a human's judgment. This can be achieved by externally providing a manually operatable switch section for forced determination for scotopic vision, as described previously.

Normally, the solid-state image capturing apparatus 1 monitors a signal amount with respect to a shutter time to adjust gain or the like. At the same time, the configuration can be set such that the relationship between the setting of a shutter time and gain, and luminous intensity is examined to start the circuit of the present invention (color matrix section 3) at a certain brightness.

In Embodiment 1, the output signal for each pixel has been explained with the output signal of RGB; however, without the limitation to this, Embodiment 1 can be applied to a solid-state image capturing apparatus with complementary colors of RGB as output signals. In addition, there are also those that include a white pixel, and the color combination is thus not limited.

Although not specifically explained in Embodiment 1, there are also methods for using signals of three pixel sections or four pixel sections of RGB for the color of a pixel used to determine brightness, and a method for limiting a color as appropriate with one or more colors of RGB of green (G) only or green (G) and blue (B), for example.

Further, in Embodiment 1, the calculation for brightness is performed for each pixel; however, without the limitation to this, the calculation can be made for every three pixels, or for each plurality of pixels, such as four pixels. In addition, as the calculation of brightness, it is also possible to derive a brightness of a predetermined small area constituting one image obtained by gathering any plural number of pixel areas. Alternatively, it is also possible to derive a brightness of any plural number of pixel areas using a method for extracting any pixel from a plural number of pixels. Alternatively, it is also possible to combine these methods.

It is also possible to set areas of two stages or more, by grasping overall brightness first and then calculating brightness in an area of color matrix calculation.

There is a case where coloring loses continuity and becomes unnatural due to the change in a color matrix depending on a position (each pixel) in one image. Thus, it is favorable to correct a detection result of brightness such that the detection result of brightness becomes continuous.

The color matrix preparing section 32 takes an average value of pixel signal values of both ends of three adjacent pixels where a color matrix changes in photopic vision and scotopic vision to obtain a middle pixel signal value, so that the color matrix preparing section 32 can prepare a color matrix such that the color matrix is changed to increase or decrease successively.

As described above, the way the human senses brightness, such as wavelength dependency, varies in scotopic vision and scotopic vision. Thus, in addition to the two stages of scotopic vision and photopic vision, it is also possible to obtain photopic vision by a plurality of stages of more than two, such as three stages or four stages.

(Embodiment 2)

In Embodiment 1, signal processing including noise reduction is performed after color matrix processing. In Embodiment 2, a case will be described where noise reduction processing is performed before color matrix processing.

Figure 3:
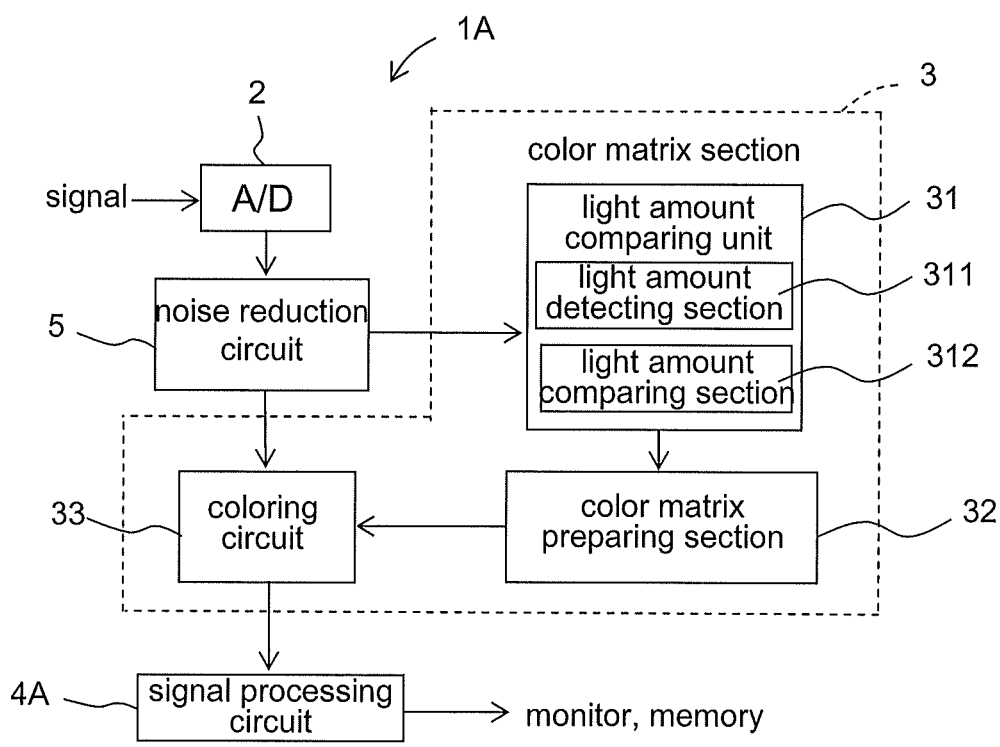
FIG. 3 is a block diagram illustrating an exemplary essential part structure of a solid-state image capturing apparatus according to Embodiment 2 of the present invention.

FIG. 3 is a block diagram illustrating an exemplary essential part structure of a solid-state image capturing apparatus according to Embodiment 2 of the present invention. In FIG. 3, the members having the same function and effect as the corresponding ones in FIG. 1 are added with the same reference numerals. A major difference from Embodiment 1 is that a noise reduction circuit 5 is provided at a prior stage of a color matrix section 3.

In FIG. 3, a solid-state image capturing apparatus 1A according to Embodiment 2 includes: an A/D conversion circuit 2 for performing A/D conversion on a pixel signal obtained by performing predetermined analog signal processing on an image-capturing signal, the image-capturing signal being from a solid-state image capturing element (not shown) provided with a plurality of light receiving sections as a plurality of pixel sections for performing a photoelectric conversion on and capturing an image of image light from an image-capturing subject; a noise reduction circuit 5 as a noise reduction section for reducing noise from a digital pixel signal from the A/D conversion circuit 2; a color matrix section 3 for performing color adjustment on a pixel signal from the noise reduction circuit 5 after noise reduction, using a color matrix in accordance with brightness of each screen position of the image-capturing subject; and a signal processing circuit 4A for performing various types of signal processing other than color matrix processing and noise reduction processing on an output signal from the color matrix section 3. A signal processing apparatus according to Embodiment 2 is constituted of the noise reduction circuit 5 and the color matrix section 3.

As similar to the case in Embodiment 1, the color matrix section 3 includes: a light amount comparing unit 31 for detecting, as a signal amount, brightness of an image-capturing subject for each pixel from a pixel signal from a noise reduction circuit 5 after noise reduction and comparing the detected signal amount with a predetermined threshold; a color matrix preparing section 32 for preparing a color matrix such that at least one non-diagonal component of the color matrix increases (non-diagonal component becomes larger towards the positive value) in accordance with the decrease in the signal amount detected; and a coloring circuit 33 performing as a coloring section for multiplying the prepared color matrix successively by an output pixel signal for each pixel from the noise reduction circuit 5 after noise reduction to perform color adjustment for each pixel of one image.

As similar to the case in Embodiment 1, the light amount comparing unit 31 includes: a light amount detecting section 311 for detecting brightness of an image-capturing subject (brightness of a pixel) as a signal amount based on an image-capturing signal (pixel signal) from a light receiving section; and a light amount comparing section 312 for comparing the detected signal amount with a predetermined threshold.

In the solid-state image capturing apparatus 1A using the signal processing apparatus according to Embodiment 2, the noise reduction circuit 5 is provided in between the A/D conversion circuit 2 and the color matrix section 3, the noise reduction circuit 5 being for removing noise from a pixel signal from the A/D conversion circuit 2. The noise reduction circuit 5 outputs a pixel signal after noise reduction, to the light amount comparing unit 31 and the coloring circuit 33.

With the structure described above, the operation will be described hereinafter.

Figure 4:
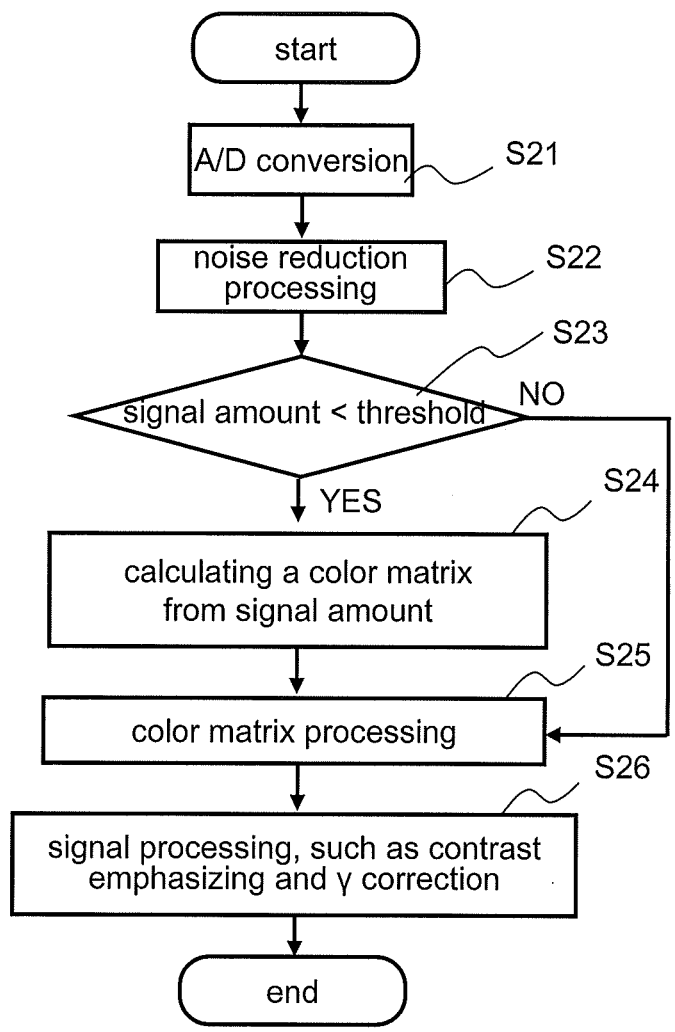
FIG. 4 is a flowchart for describing an operation of the solid-state image capturing apparatus 1A of FIG. 3.

FIG. 4 is a flowchart for describing an operation of the solid-state image capturing apparatus 1A of FIG. 3.

As illustrated in FIG. 4, first, the A/D conversion circuit 2 performs A/D conversion on a pixel signal and outputs a digital pixel signal (Step S21), where the pixel signal is obtained by performing predetermined analog signal processing on an image-capturing signal, the image-capturing signal being from a solid-state image capturing element (not shown) provided with a plurality of light receiving sections as a plurality of pixel sections for performing a photoelectric conversion on and capturing an image of image light from an image-capturing subject (one image).

Next, the noise reduction circuit 5 reduces noise from the digital pixel signal from the A/D conversion circuit 2 (step S22). Thereby, the detection accuracy of brightness can be increased in the light amount detecting section 311.

Further, the light amount detecting section 311 accurately detects the brightness of the image-capturing subject as a signal amount, based on the pixel signal after the noise reduction. Then, the light amount comparing section 312 compares the detected signal amount with a predetermined threshold (Step S23).

Thereafter, the color matrix preparing section 32 prepares a color matrix such that at least one non-diagonal component of the color matrix increases in accordance with the decrease in the signal amount detected, as a comparative result of the light amount comparing section 312 (step S24).

Subsequently, the coloring circuit 33 successively multiplies the color matrix prepared by the color matrix preparing section 32 by the output signal for each pixel from the noise reduction circuit 5 toper form color adjustment on one image for each pixel section (Step S25).

In this case, the color matrix section 3 performs color matrix processing at step S25 using a predetermined color matrix for photopic vision with respect to a photopic vision pixel of an image (NO at step S23). The color matrix section 3 also starts the color matrix preparing section 32 in the color matrix section 3 to prepare a color matrix for scotopic vision (step S24) with respect to a scotopic vision pixel of an image (YES at step S23), and uses the color matrix to perform color matrix processing at step S25.

That is, in the case of a photopic vision pixel of an image (NO at step S23), a color matrix for photopic vision is stored regularly in a storage section in the color matrix preparing section 32, and the color matrix is read out to perform color matrix processing at step S25. In the case of scotopic vision pixel of an image (YES at step S23), at step S24, the color matrix preparing section 32 prepares a color matrix for scotopic vision such that at least one non-diagonal component of the color matrix increases in accordance with the decrease in the signal amount detected.

Further, the signal processing circuit 4A performs various types of signal processing such as black level, white balance, color interpolation, contrast emphasizing and γ correction on an output image signal from the coloring circuit 33, as signal processing other than color matrix processing or noise reduction processing (step S26). A color image signal outputted from the signal processing circuit 4A is processed in a predetermined signal processing manner for display and is then displayed on a screen of a monitor as a display section. Alternatively, the image signal is processed in a predetermined signal processing manner (e.g., compression signal processing) for storing and is then stored in a memory as a storing section.

Hereinafter, a case will be described where noise is reduced by a noise filter such as median, for example, as the noise reduction circuit 5, with regard to output signals for every four pixels, for example, and pixels of Bayer arrangement of R, G and B are assumed to calculate a luminance signal for every four pixels.

The luminance signal takes logarithms and is defined as X for explanation.

When X corresponds to the luminous intensity of 0.1 lx, the matrix will be as the following formula (13).

$$\begin{pmatrix} R \text{ display} \\ G \text{ display} \\ B \text{ display} \end{pmatrix} = \begin{pmatrix} 0.2 & 0.4 & 0.4 \\ 0.2 & 0.4 & 0.4 \\ 0.2 & 0.4 & 0.4 \end{pmatrix} \begin{pmatrix} R \text{ image capturing} \\ G \text{ image capturing} \\ B \text{ image capturing} \end{pmatrix} \quad (13)$$

When X corresponds to the luminous intensity of 100 lx, the matrix will be interpolated linearly to X as the following formula (14) to derive a color matrix.

$$\begin{pmatrix} R \text{ display} \\ G \text{ display} \\ B \text{ display} \end{pmatrix} = \begin{pmatrix} 2 & -0.5 & -0.5 \\ -0.5 & 2 & -0.5 \\ -0.5 & -0.5 & 2 \end{pmatrix} \begin{pmatrix} R\text{: image capturing} \\ G\text{: image capturing} \\ B\text{: image capturing} \end{pmatrix} \quad (14)$$

When the corresponding luminous intensity of X is outside the range described above, 0.1 lx or less is set for the formula (13) and 100 lx or more is set for the formula (14).

The thus obtained color matrix is multiplied by the output signal, which is the basis of the calculation for luminance, to obtain RGB signals. Thereby, an image with high color reproducibility and few noise can be obtained at a dark time.

According to Embodiment 2 as described above, false signals such as noise are reduced before color matrix calculation, so that detection accuracy can be increased for brightness.

As explained in Embodiment 1, there is also a method, in which a part or all of a color matrix is calculated in advance in the color matrix preparing section 32 and the calculation result is stored in a storing section (memory), and the calculation result is read out from a table with brightness as a variable.

Figure 5:
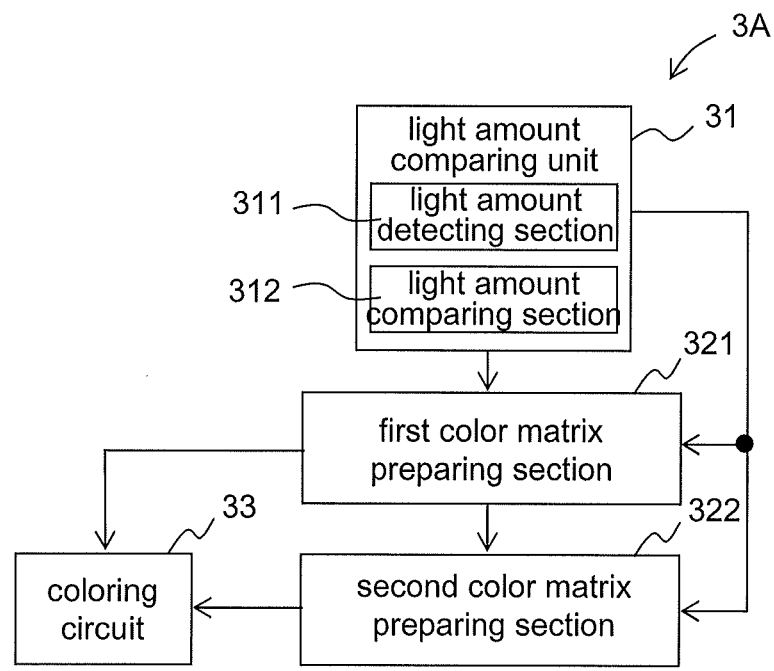
FIG. 5 is a block diagram illustrating an exemplary variation of a color matrix section 3 of FIG. 3.

That is, the color matrix preparing section 32 can be configured to be provided with a storing section for storing in advance a predetermined color matrix used during photopic vision, so that processing is performed using the color matrix in the storing section during photopic vision. This will be explained with reference to FIG. 5. FIG. 5 can be applied to Embodiment 3 to be described later, in addition to Embodiments 1 and 2.

FIG. 5 is a block diagram illustrating an exemplary variation of a color matrix section 3 of FIG. 3.

As illustrated in FIG. 5, a color matrix section 3A includes: a light amount comparing unit 31 for detecting brightness of an image-capturing subject (or pixel) based on a pixel signal, from which noise is reduced, from a noise reduction circuit 5; a first color matrix preparing section 321 as a first color matrix preparing means with a color matrix for scotopic vision stored in a storing section, the color matrix being for increasing a non-diagonal component of a color matrix and used when the brightness detected in the light amount comparing unit 31 is less than a threshold; a second color matrix preparing section 322 as a second color matrix preparing means with a color matrix for photopic vision stored in a storing section, the color matrix being used when the brightness detected in the light amount comparing unit 31 is at or more than a threshold; and a coloring circuit 33 as a coloring means for successively multiplying a color matrix, which is read out from the storing section after the first color matrix preparing section 321 or second color matrix preparing section 322 is selected, by a pixel signal from the noise reduction circuit 5 for color adjustment.

Although not specifically explained in Embodiment 1 or 2, it is possible to use two types of the color matrices for photopic vision and scotopic vision in accordance with the type of light source. The type of light source includes a sun light in the outdoors, and a light bulb, a fluorescent lamp and the like in the indoors. It is also possible to change color matrices depending on these light sources for better displaying.

In Embodiments 1 and 2, brightness from an output signal level for each pixel is obtained when brightness of an image-capturing subject is detected appropriately. However, without the limitation to this, it is also possible to prepare another solid-state image capturing element used only for measuring brightness. This case will be explained in the following Embodiment 3.

(Embodiment 3)

In Embodiments 1 and 2, the case is described where the light amount detecting section 311 detects brightness of a pixel, as a signal amount, based on a pixel signal from a light receiving section. In Embodiment 3, a case will be described where not a pixel signal, but a section used only for measuring brightness, is separately prepared.

Figure 6:
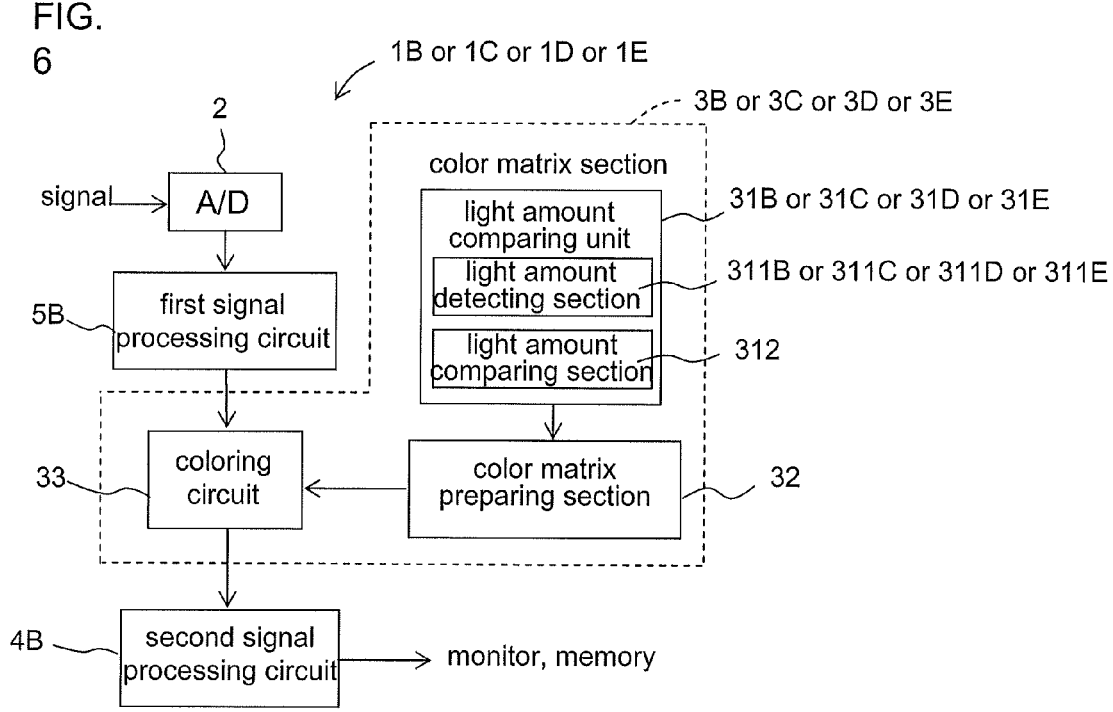
FIG. 6 is a block diagram illustrating an exemplary essential part structure of a solid-state image capturing apparatus according to Embodiment 3 of the present invention.

FIG. 6 is a block diagram illustrating an exemplary essential part structure of a solid-state image capturing apparatus according to Embodiment 3 of the present invention.

In FIG. 6, a solid-state image capturing apparatus 1B according to Embodiment 3 includes: an A/D conversion circuit 2 for performing A/D conversion on a pixel signal obtained by performing predetermined analog signal processing on an image-capturing signal, the image-capturing signal being from a solid-state image capturing element (not shown) provided with a plurality of light receiving sections as a plurality of pixel sections for performing a photoelectric conversion on and capturing an image of image light from an image-capturing subject; a first signal processing circuit 5B for performing various types of signal processing such as black level, white balance, color interpolation and noise reduction, on a digital pixel signal from the A/D conversion circuit 2; a color matrix section 3B for performing color adjustment using a color matrix in accordance with brightness of each screen position of the image-capturing subject, with respect to the pixel signal after signal processing from the first signal processing circuit 5B; and a second signal processing circuit 43 for performing various types of signal processing, other than color matrix processing and noise reduction processing, on an output signal from the color matrix section 33. A signal processing apparatus according to Embodiment 3 is constituted of the first signal processing circuit 5B and the color matrix section 3B.

The color matrix section 33 includes: a light amount comparing unit 313 for detecting, as a signal amount, brightness of a predetermined position of an image with respect to a pixel signal after signal processing from the first signal processing circuit 5B, and comparing the detected signal amount with a predetermined threshold; a color matrix preparing section 32 for preparing a color matrix for scotopic vision such that at least one non-diagonal component of the color matrix increases (non-diagonal component becomes larger towards the positive value) in accordance with the decrease in the signal amount detected; and a coloring circuit 33 performing as a coloring section for multiplying the prepared color matrix successively by a pixel signal from the first signal processing circuit 5B to perform color adjustment for each plurality of pixels of one image.

The light amount comparing unit 31B is provided with a separate dedicated section used only for measuring brightness (a solid-state image capturing element for measuring light); and the light amount comparing unit 31B includes a light amount detecting section 311B used only for detecting brightness of a pixel as a signal amount; and a light amount comparing section 312 for comparing the signal amount detected by the light amount detecting section 311B used only for the detection purpose, with a predetermined threshold.

With the structure described above, the operation will be described.

Figure 7:
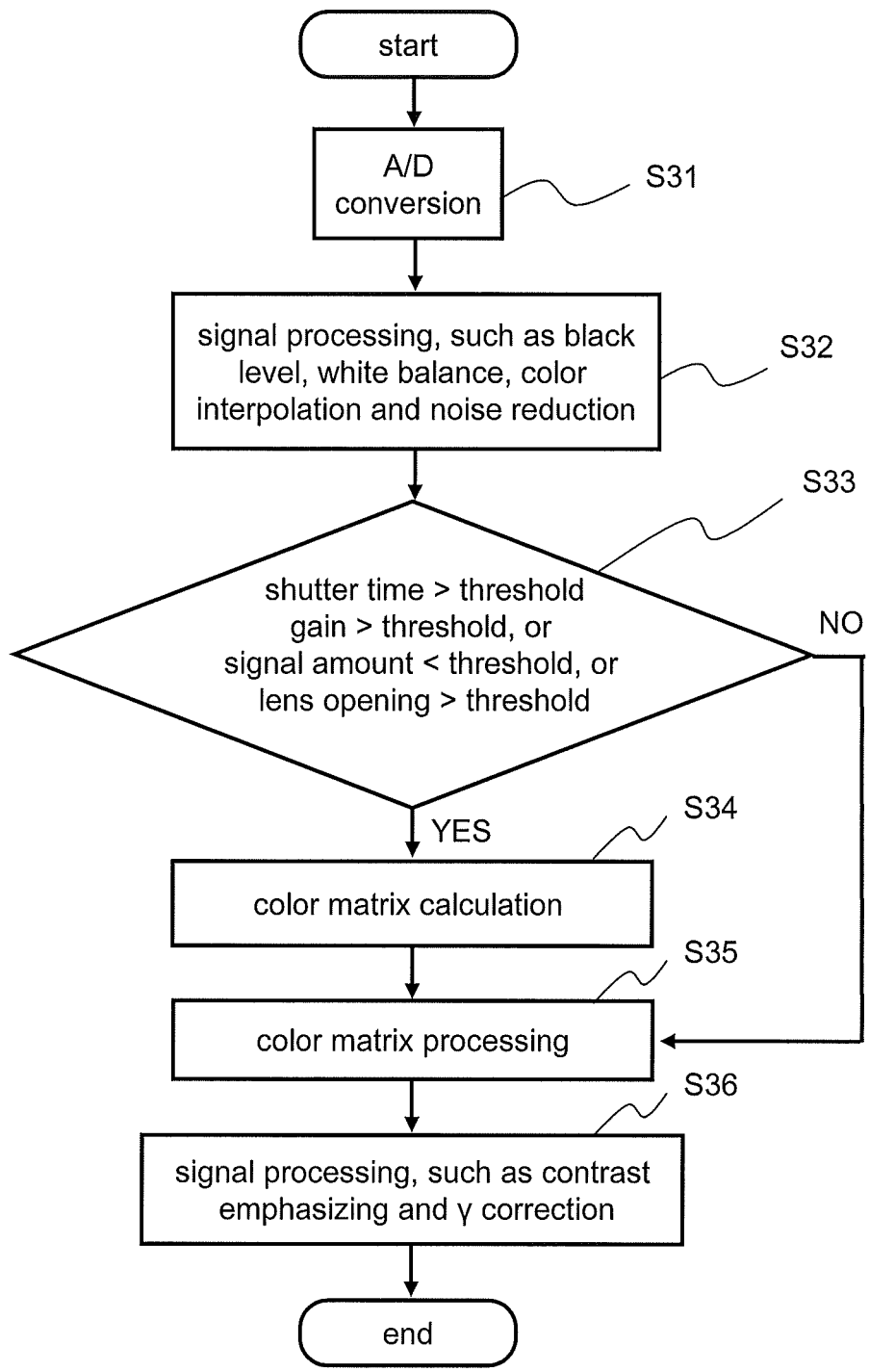
FIG. 7 is a flowchart for describing operation of the solid-state image capturing apparatus 1B of FIG. 6.

FIG. 7 is a flowchart for describing operation of the solid-state image capturing apparatus 1B of FIG. 6.

As illustrated in FIG. 7, first, the A/D conversion circuit 2 performs A/D conversion on a pixel signal and outputs a digital pixel signal (Step S31), where the pixel signal is obtained by performing predetermined analog signal processing on an image-capturing signal, the image-capturing signal being from a solid-state image capturing element (not shown) provided with a plurality of light receiving sections as a plurality of pixel sections for performing a photoelectric conversion on and capturing an image of image light from an image-capturing subject (one image).

Next, the first signal processing circuit 5B performs various types of signal processing such as black level, white balance, color interpolation and noise reduction, on the digital pixel signal from the A/D conversion circuit 2 (step S32). By the noise reduction processing, the detection accuracy of brightness can be increased in the light amount detecting section 311B.

Further, the light amount detecting section 313B detects the brightness of the image-capturing subject as a signal amount, based on a signal from a separate dedicated section used only for measuring brightness (solid-state image capturing element for measuring light). Then, the light amount comparing section 312 compares the detected signal amount with a predetermined threshold (Step S33).

Thereafter, the color matrix preparing section 32 prepares a color matrix such that at least one non-diagonal component of the color matrix increases in accordance with the decrease in the signal amount detected, as a comparative result of the light amount comparing section 312 (step S34).

Subsequently, the coloring circuit 33 successively multiplies the color matrix prepared by the color matrix preparing section 32 by the output pixel signal for each plurality of pixels from the first signal processing circuit 5B to perform color adjustment on one image for each pixel (Step S35).

In this case, the color matrix section 3B performs color matrix processing at step S35 using a predetermined color matrix for photopic vision with respect to a photopic vision pixel of an image (NO at step S33). The color matrix section 3B also starts the color matrix preparing section 32 in the color matrix section 3B to prepare a color matrix for scotopic vision (step S34) with respect to a scotopic vision pixel of an image (YES at step S33), and uses the color matrix to perform color matrix processing at step S35. That is, in the case of a photopic vision pixel of an image (NO at step S33), a color matrix for photopic vision is stored regularly in a storage section in the color matrix preparing section 32, and the color matrix is read out to perform color matrix processing at step S35. In the case of scotopic vision pixel of an image (YES at step S33), at step S34, the color matrix preparing section 32 prepares a color matrix for scotopic vision such that at least one non-diagonal component of the color matrix increases in accordance with the decrease in the signal amount detected.

Further, the signal processing circuit 43 performs various types of signal processing such as contrast emphasizing and γ correction on an output image signal from the coloring circuit 33, as signal processing other than color matrix processing or noise reduction processing (step S36). A color image signal outputted from the signal processing circuit 4B is processed in a predetermined signal processing manner for display and is then displayed on a screen of a monitor as a display section. Alternatively, the image signal is processed in a predetermined signal processing manner (e.g., compression signal processing) for storing and is then stored in a memory as a storing section.

According to Embodiment 3 as described above, detection of brightness of a pixel by the light amount detecting section 311B can be performed more readily and accurately.

As also stated in Embodiment 1 above, since it is difficult in general to measure luminance and luminous intensity for each pixel, it is also possible to function the present invention (which is to prepare a color matrix so as to increase a non-diagonal component of the color matrix during scotopic vision) by setting of a shutter time or gain (e.g., feedback from set values of the solid-state image capturing apparatus 1, such as a shutter time and gain). In doing so, it is also possible to consider an overall signal amount and a partial signal amount (signal amount for each pixel). In addition, it is also possible to function the present invention (which is to prepare a color matrix so as to increase a non-diagonal component of the color matrix during scotopic vision) by the setting of lenses and in particular a lens opening. Further, it is also possible to input brightness based on a human's judgment. This can be achieved by externally providing a manually operatable switch section (not shown) for forced determination for scotopic vision, as described previously.

Normally, the solid-state image capturing apparatus 1 monitors a signal amount with respect to a shutter time to adjust gain or the like. At the same time, the configuration can be set such that the relationship between the setting of a shutter time and gain, and luminous intensity is examined to start the circuit of the present invention (color matrix section 3B) at a certain brightness.

That is, as illustrated in FIG. 6, a light amount comparing unit 31C of a color matrix section 3C includes: a light amount detecting section 311C for detecting brightness of a pixel based on a shutter time which changes in accordance with the brightness of the pixel; and a light amount comparing section 312 for comparing the detected shutter time with a predetermined threshold.

The light amount detecting section 311C monitors a shutter time, and the light amount comparing section 312 determines that it is scotopic vision when a shutter time is at or more than a predetermined time length as a threshold. When the shutter time is less than a predetermined time length as a threshold, the light amount comparing section 312 determines that it is photopic vision.

The color matrix preparing section 32 prepares a color matrix for scotopic vision when the light amount comparing section 312 determines a shutter time to be at or more than a threshold, such that a non-diagonal component of a color matrix increases. The color matrix preparing section 32 prepares a color matrix for photopic vision when the light amount comparing section 312 determines a shutter time to be less than a threshold.

In this case, at step S33 of FIG. 7, the light amount detecting section 311C detects brightness of an image-capturing subject based on a shutter time, and the light amount comparing section 312 compares the detected brightness with a predetermined threshold. The subsequent operation is the same as described above. With the structure described above, a solid-state image capturing apparatus 1C, which uses a shutter time for brightness detection, is constituted.

Next, as illustrated in FIG. 6, a light amount comparing unit 31D of a color matrix section 3D includes: a light amount detecting section 311D for detecting brightness of a pixel based on a gain value which changes in accordance with the brightness of the pixel; and a light amount comparing section 312 for comparing the detected gain value with a predetermined threshold.

The light amount detecting section 311D monitors a gain value. The light amount comparing section 312 determines that it is scotopic vision when the gain value is at or more than a predetermined rate as a threshold, and the light amount comparing section 312 determines that it is photopic vision when the gain value is less than a predetermined rate as a threshold.

The color matrix preparing section 32 prepares a color matrix for scotopic vision when the light amount comparing section 312 determines that the gain value is at or more than the threshold, such that a non-diagonal component of the color matrix increases. The color matrix preparing section 32 prepares a color matrix for photopic vision when the light amount comparing section 312 determines that the gain value is less than the threshold.

In this case, at step S33 of FIG. 7, a light amount detecting section 311D detects brightness of an image-capturing subject based on a gain value, and the light amount comparing section 312 compares the detected brightness with a predetermined threshold. The subsequent operation is the same as described above. With the structure described above, a solid-state image capturing apparatus 1D, which uses a gain value for brightness detection, is constituted.

Next, as illustrated in FIG. 6, a light amount comparing unit 31E of a color matrix section 3E includes: a light amount detecting section 311E for detecting brightness of a pixel based on a lens opening; and a light amount comparing section 312 for comparing the detected lens opening with a predetermined threshold.

The light amount detecting section 311E monitors a lens opening. The light amount comparing section 312 determines that it is scotopic vision when the lens opening is at or more predetermined value as a threshold, and the light amount comparing section 312 determines that it is photopic vision when the lens opening is less than a predetermined value as a threshold.

The color matrix preparing section 32 prepares a color matrix for scotopic vision when the light amount comparing section 312 determines a lens opening to be at or more than a threshold, such that a non-diagonal component of a color matrix increases. The color matrix preparing section 32 prepares a color matrix for photopic vision when the light amount comparing section 312 determines a lens opening to be less than a threshold.

In this case, at step S33 of FIG. 7, the light amount detecting section 311E detects brightness of an image-capturing subject based on a lens opening (F value), and the light amount comparing section 312 compares the detected brightness with a predetermined threshold. The subsequent operation is the same as described above. With the structure described above, a solid-state image capturing apparatus 1E, which uses a lens opening (F value) for brightness detection, is constituted.

In any case, as described previously, it is possible to use any of a signal amount, a shutter time, a gain value and a lens opening (F value), as an item for detection of brightness of a pixel; however, without the limitation to this, a plurality of items may be used from a signal amount, a shutter time, a gain value and a lens opening (F value), for the brightness detection. It is also possible to use all of the signal amount, the shutter time, the gain value and the lens opening (F value).

(Embodiment 4)

Figure 8:
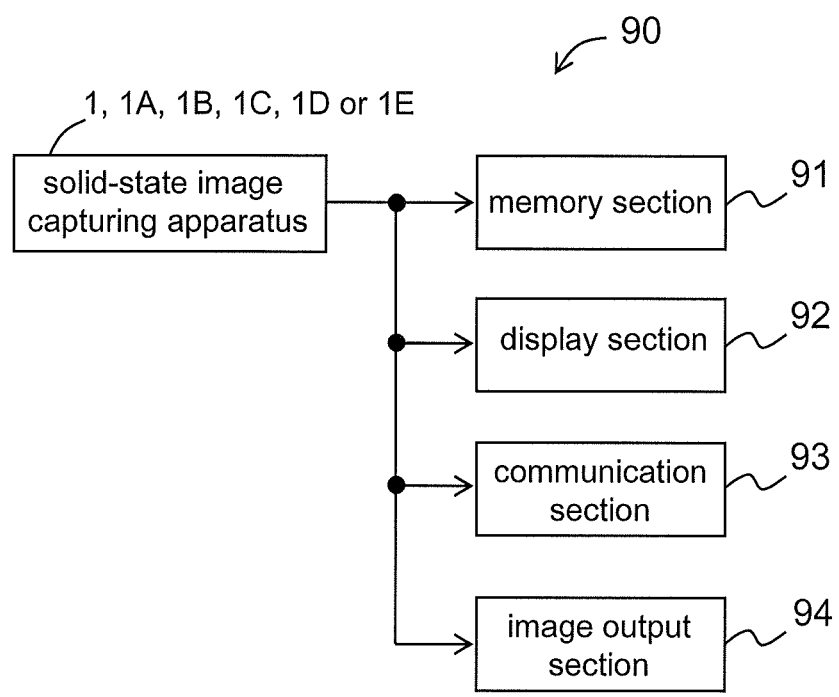
FIG. 8 is a block diagram schematically illustrating an exemplary schematic structure of an electronic information device of Embodiment 4 of the present invention, including any of the solid-state image capturing apparatuses according to Embodiment 1 to 3 of the present invention used in an image capturing section thereof.
Figure 9:
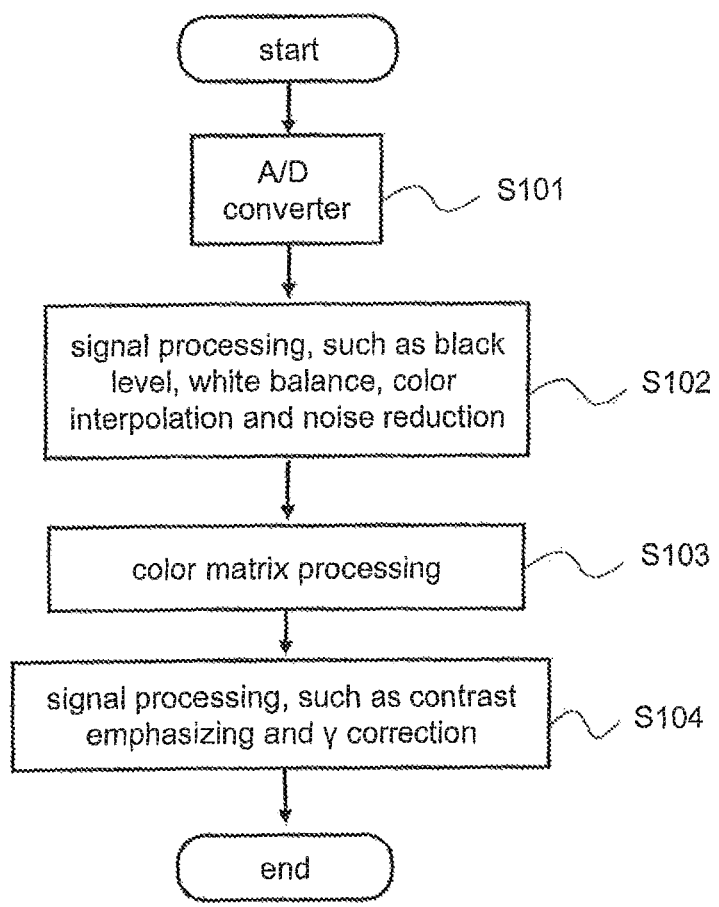
FIG. 9 is a flowchart schematically illustrating an image processing operation of a conventional solid-state image capturing apparatus.
Figure 10:
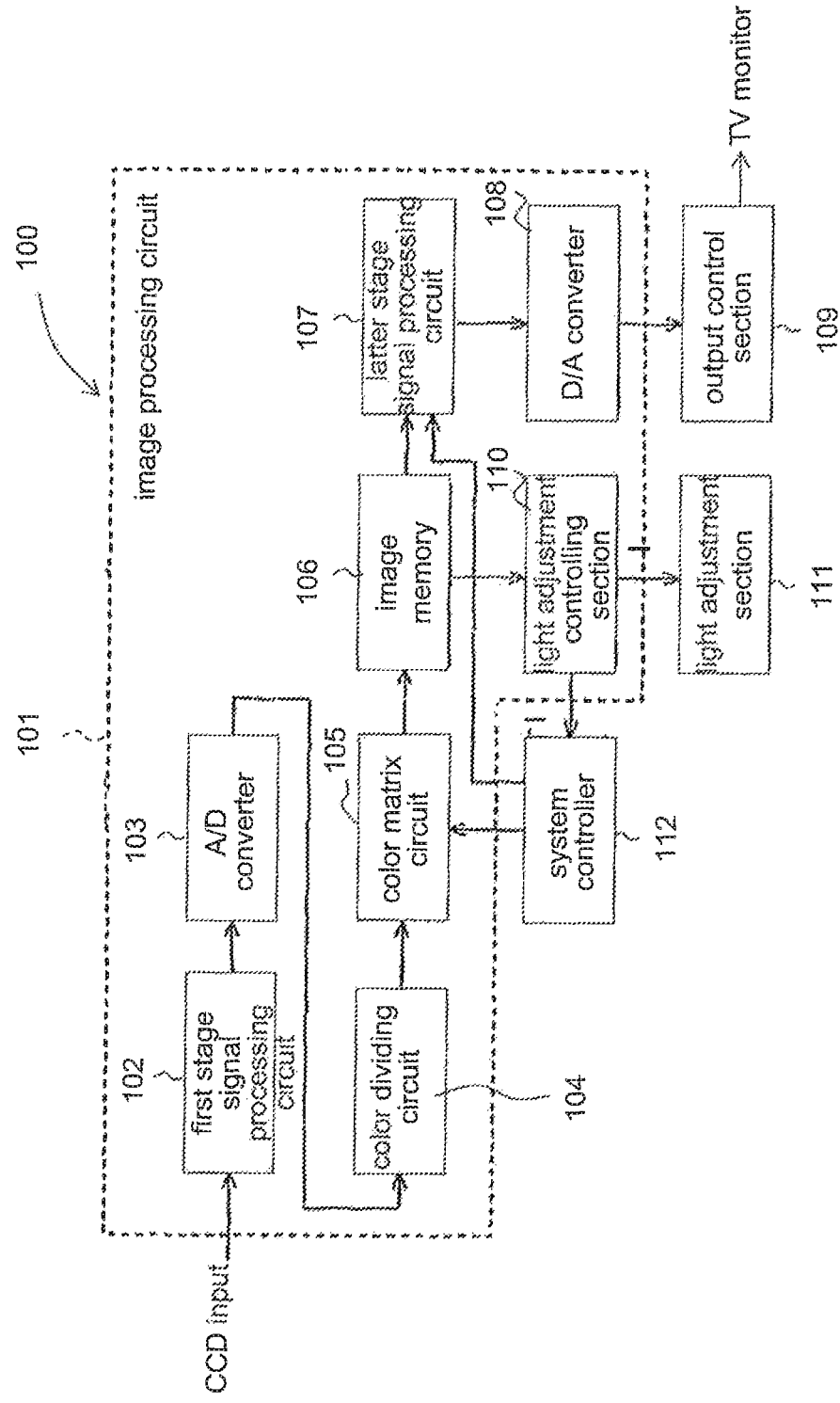
FIG. 10 is a block diagram illustrating an exemplary structure of an image processing circuit of a conventional CCD solid-state image capturing apparatus disclosed in Reference 1.
Figure 11:
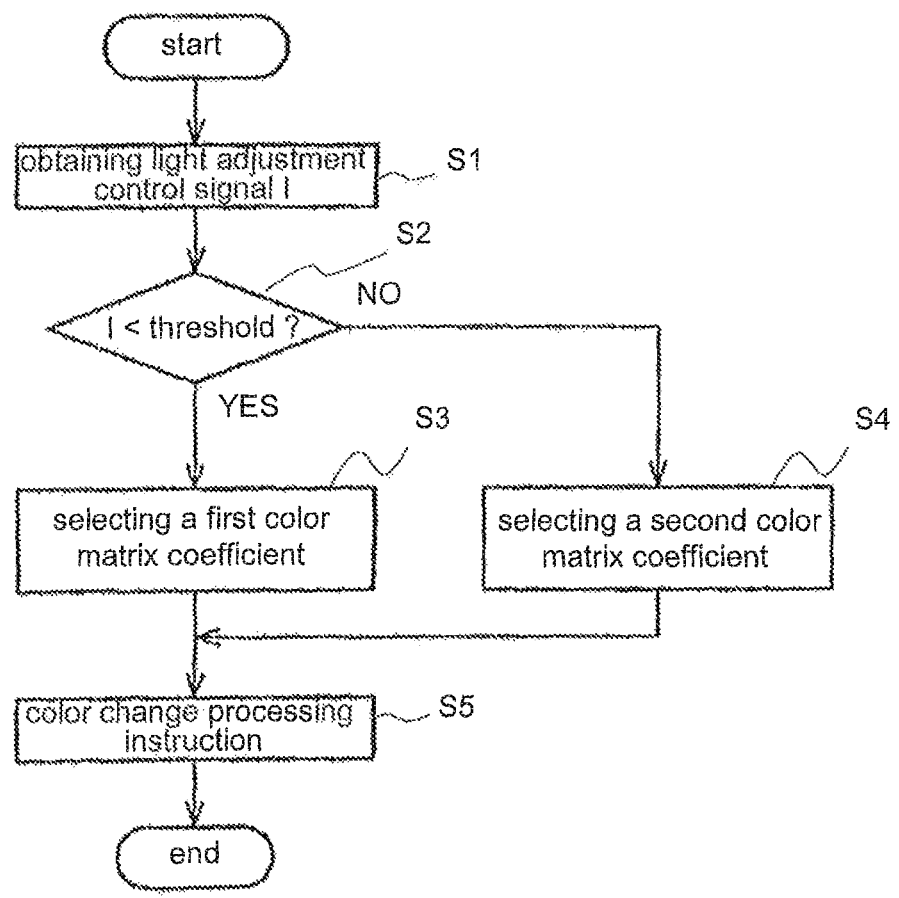
FIG. 11 is a flowchart illustrating processing procedures of a color conversion adjustment by the system controller of FIG. 10.

FIG. 8 is a block diagram schematically illustrating an exemplary schematic structure of an electronic information device of Embodiment 4 of the present invention, including any of the solid-state image capturing apparatuses according to Embodiment 1 to 3 of the present invention used in an image capturing section thereof.

In FIG. 8, an electronic information device 90 according to Embodiment 4 of the present invention includes: a solid-state image capturing apparatus 1, 1A, 1B, 1C, 1D or 1E according to Embodiments 1 to 3; a memory section 91 (e.g., recording media) for data-recording the color image signal from the solid-state image capturing apparatus 1, 1A, 1B, 1C, 1D or 1E after predetermined signal processing is performed on the color image signal for recording; a display section 92 (e.g., a liquid crystal display apparatus) for displaying the color image signal from the solid-state image capturing apparatus 1, 1A, 1B, 1C, 1D or 1E on a display screen (e.g., liquid crystal display screen) after predetermined signal processing is performed on the color image signal for display; a communication section 93 (e.g., a transmitting and receiving device) for communicating the color image signal from the solid-state image capturing apparatus 1, 1A, 1B, 1C, 1D or 1E after predetermined signal processing is performed on the color image signal for communication; and an image output section 94 (e.g., a printer) for the color image signal from the solid-state image capturing apparatus 1, 1A, 1B, 1C, 1D or 1E after predetermined signal processing is performed for printing. Without the limitation to this, the electronic information device 90 may include at least any of the memory section 91, the display section 92, the communication section 93, and the image output section 94 such as a printer, other than the solid-state image capturing apparatus 1, 1A, 1B, 1C, 1D or 1E.

As the electronic information device 90, an electronic device that includes an image input device is conceivable, such as a digital camera (e.g., digital video camera or digital still camera), an image input camera (e.g., a monitoring camera, a door phone camera, a camera equipped in a vehicle including a vehicle back view monitoring camera, or a television telephone camera), a scanner, a facsimile machine, a camera-equipped cell phone device and a portable digital assistant (PDA).

Therefore, according to embodiment 4 of the present invention, the color image signal from the solid-state image capturing apparatus 1, 1A, 1B, 1C, 1D or 1E can be: displayed on a display screen properly; printed out on a sheet of paper using an image output section 94; communicated properly as communication data via a wire or a radio; stored properly at the memory section 91 by performing predetermined data compression processing; and further various data processes can be properly performed.

As described above, the present invention is exemplified by the use of its preferred Embodiments 1 to 4. However, the present invention should not be interpreted solely based on Embodiments 1 to 4 described above. It is understood that the scope of the present invention should be interpreted solely based on the claims. It is also understood that those skilled in the art can implement equivalent scope of technology, based on the description of the present invention and common knowledge from the description of the detailed preferred Embodiments 1 to 4 of the present invention. Furthermore, it is understood that any patent, any patent application and any references cited in the present specification should be incorporated by reference in the present specification in the same manner as the contents are specifically described therein.

INDUSTRIAL APPLICABILITY

The present invention can be applied in the field of a signal processing apparatus and a signal processing method for processing pixel signals corresponding to a plurality of respective pixels; a solid-state image capturing device, such as a CCD solid-state image capturing apparatus or a CMOS solid-state image capturing apparatus, and in particular, a solid-state image capturing apparatus which divides light into wavelength using a color filter to obtain a color image signal so as to correspond to a human's sense of sight, for performing a photoelectric conversion on and capturing an image of image light from a subject, using the signal processing apparatus and the signal processing method; an electronic information device, such as a digital camera (e.g., a digital video camera or a digital still camera), an image input camera (e.g., a monitoring camera), a scanner, a facsimile machine, a television telephone device, and a camera-equipped cell phone device, which electronic information device includes the solid-state image capturing element as an image input device used in an image capturing section thereof; a control program in which processing procedures for allowing a computer to execute each of the steps of the signal processing method are described; and a computer-readable storage medium storing the control program. In the present invention, the color matrix section 3 for detecting the brightness of a pixel and performing color adjustment processing on a pixel signal using a color matrix in accordance with the brightness of the detected pixel is provided, so that it becomes possible to use the most appropriate color matrix in accordance with the brightness of each position (each pixel position) of an image-capturing subject,

What is claimed is:

1. A signal processing apparatus for processing pixel signals corresponding to a plurality of respective pixels, the signal processing apparatus comprising:
   a color matrix section for detecting brightness of a pixel and performing color adjustment on the pixel signals using a color matrix in accordance with the detected brightness of the pixel,
   wherein the color matrix section includes:
   a light amount comparing unit for detecting brightness of the pixel to compare the detected brightness with a predetermined threshold;
   a color matrix preparing section for preparing a color matrix such that at least one non-diagonal component of the color matrix increases in accordance with the decrease in the detected brightness; and
   a coloring section for multiplying the prepared color matrix by an output pixel signal for each pixel, for each plurality of pixels, or for each one or plurality of pixels sampled from a plurality of pixels, to perform color adjustment.

2. A signal processing apparatus according to claim 1, wherein the signal processing apparatus performs color matrix processing on a photopic vision pixel of an image, using a predetermined color matrix for photopic vision, and starts the color matrix section to perform color matrix processing on a scotopic vision pixel of the image, using a color matrix for scotopic vision.

3. A signal processing apparatus according to claim 1, wherein the light amount comparing unit includes: a light amount detecting section for detecting brightness of the pixel as a signal amount based on the pixel signal; and a light amount comparing section for comparing the detected signal amount with a predetermined threshold.

4. A signal processing apparatus according to claim 3, wherein the light amount detecting section detects a signal amount for the each pixel, for the each plurality of pixels, or for the each one or plurality of pixels sampled from a plurality of the pixels.

5. A signal processing apparatus according to claim 4, wherein the light amount detecting section detects a signal amount from a pixel signal of a pixel with the limitation of one or more colors, for the each pixel, for the each plurality of pixels, or for the each one or plurality of pixels sampled from a plurality of the pixels.

6. A signal processing apparatus according to claim 5, wherein the one or more colors are at least either green (G) or blue (B).

7. A signal processing apparatus according to claim 1, wherein the light amount comparing unit includes: a dedicated light amount detecting section for dedicatedly detecting brightness of the pixel as a signal amount; and a light amount comparing section for comparing the signal amount dedicatedly detected by the dedicated light amount detecting section with a predetermined threshold.

8. A signal processing apparatus according to claim 1, wherein the light amount comparing unit includes: a light amount detecting section for detecting brightness of the pixel based on a shutter time which changes in accordance with the brightness of the pixel; and a light amount comparing section for comparing the detected shutter time with a predetermined threshold.

9. A signal processing apparatus according to claim 1, wherein the light amount comparing unit includes: a light amount detecting section for detecting brightness of the pixel based on a gain value which changes in accordance with the brightness of the pixel; and a light amount comparing section for comparing the detected gain value with a predetermined threshold.

10. A signal processing apparatus according to claim 1, wherein the light amount comparing unit includes: a light amount detecting section for detecting brightness of the pixel based on a lens opening; and a light amount comparing section for comparing the detected lens opening with a predetermined threshold.

11. A signal processing apparatus according to claim 8, wherein the light amount comparing unit monitors the shutter time, and determines that it is scotopic vision when the shutter time is at or more than a predetermined time length as a threshold, and determines that it is photopic vision when the shutter time is less than the predetermined time length as a threshold.

12. A signal processing apparatus according to claim 9, wherein the light amount comparing unit monitors the gain value, and determines that it is scotopic vision when the gain value is at or more than a predetermined rate as a threshold, and determines that it is photopic vision when the gain value is less than the predetermined rate as a threshold.

13. A signal processing apparatus according to claim 10, wherein the light amount comparing unit monitors the lens opening, and determines that it is scotopic vision when the lens opening is at or more than a predetermined value as a threshold, and determines that it is photopic vision when the lens opening is less than the predetermined value as a threshold.

14. A signal processing apparatus according to claim 3, wherein the light amount comparing section sets that it is photopic vision when luminous intensity of a subject in the light amount detecting section is 30 lux or more or 100 lux or more, or a signal amount is 5 candela or more or 30 candela or more as the brightness, and the light amount comparing section sets that it is scotopic vision when the luminous intensity of the subject in the light amount detecting section is less than 30 lux or less than 100 lux, or the signal amount is less than 5 candela or 30 candela.

15. A signal processing apparatus according to claim 7, wherein the light amount comparing section sets that it is photopic vision when luminous intensity of a subject in the light amount detecting section is 30 lux or more or 100 lux or more, or a signal amount is 5 candela or more or 30 candela or more as the brightness, and the light amount comparing section sets that it is scotopic vision when the luminous intensity of the subject in the light amount detecting section is less than 30 lux or less than 100 lux, or the signal amount is less than 5 candela or 30 candela.

16. A signal processing apparatus according to claim 3, wherein the light amount detecting section obtains brightness of the pixel by detecting a signal amount from a luminance signal and weighting the signal amount in accordance with a color of the pixel and then summing up each signal amount with different colors or taking an average value among the different colors.

17. A signal processing apparatus according to claim 7, wherein the light amount detecting section obtains brightness of the pixel by detecting a signal amount from a luminance signal and weighting the signal amount in accordance with a color of the pixel and then summing up each signal amount with different colors or taking an average value among the different colors.

18. A signal processing apparatus according to claim 16, wherein the light amount detecting section obtains the signal amount using luminance signal Y1=0.3R+0.6G+0.1B, in the case of photopic vision, and obtains the signal amount by using luminance signal Y2=0.5G+0.5B, in the case of scotopic vision.

19. A signal processing apparatus according to claim 17, wherein the light amount detecting section obtains the signal amount using luminance signal Y1=0.3R+0.6G+0.1B, in the case of photopic vision, and obtains the signal amount by using luminance signal Y2=0.5G+0.5B, in the case of scotopic vision.

20. A signal processing apparatus according to claim 1, further including an A/D conversion circuit for converting an analog signal of the pixel signal into a digital signal, at a prior stage of the color matrix section.

21. A signal processing apparatus according to claim 20, wherein a noise reduction section is provided in between the A/D conversion circuit and the color matrix section, and the noise reduction circuit outputs a pixel signal after noise reduction to the light amount comparing unit and the coloring section.

22. A signal processing apparatus according to claim 2, wherein a non-diagonal component of at least one color of the color matrix for scotopic vision is positive, and a diagonal component of the one color also includes at least one component of 1 or less.

23. A signal processing apparatus according to claim 2, wherein the color matrix for scotopic vision increases a coefficient relating to an output pixel signal of blue and green and decreases a coefficient relating to an output pixel signal of red, with respect to the color matrix for photopic vision.

24. A signal processing apparatus according to claim 2, wherein two types or more of the color matrices for photopic vision and scotopic vision are used in accordance with the type of light source.

25. A signal processing apparatus according to claim 3, wherein the color matrix preparing section includes:
 a first color matrix preparing section for preparing the color matrix for scotopic vision such that a non-diagonal component of the color matrix increases when the light amount comparing unit determines that the signal amount is less than a threshold; and
 a second color matrix preparing section for preparing the color matrix for photopic vision when the light amount comparing unit determines that the signal amount is at or more than the threshold.

26. A signal processing apparatus according to claim 7, wherein the color matrix preparing section includes:
 a first color matrix preparing section for preparing the color matrix for scotopic vision such that a non-diagonal component of the color matrix increases when the light amount comparing unit determines that the signal amount is less than a threshold; and
 a second color matrix preparing section for preparing the color matrix for photopic vision when the light amount comparing unit determines that the signal amount is at or more than the threshold.

27. A signal processing apparatus according to claim 8, wherein the color matrix preparing section includes:
 a first color matrix preparing section for preparing the color matrix for scotopic vision such that a non-diagonal component of the color matrix increases when the light amount comparing unit determines that the shutter time is at or more than a threshold; and
 a second color matrix preparing section for preparing the color matrix for photopic vision when the light amount comparing unit determines that the shutter time is less than the threshold.

28. A signal processing apparatus according to claim 9, wherein the color matrix preparing section includes:
 a first color matrix preparing section for preparing the color matrix for scotopic vision such that a non-diagonal component of the color matrix increases when the light amount comparing unit determines that the gain value is at or more than a threshold; and
 a second color matrix preparing section for preparing the color matrix for photopic vision when the light amount comparing unit determines that the gain value is less than the threshold.

29. A signal processing apparatus according to claim 10, wherein the color matrix preparing section includes:
 a first color matrix preparing section for preparing the color matrix for scotopic vision such that a non-diagonal component of the color matrix increases when the light amount comparing unit determines that the lens opening is at or more than a threshold; and
 a second color matrix preparing section for preparing the color matrix for photopic vision when the light amount comparing unit determines that the lens opening is less than the threshold.

30. A signal processing apparatus according to claim 1, wherein as an increase in a non-diagonal component of the color matrix, the color matrix preparing section increases the non-diagonal component towards a positive value.

31. A signal processing apparatus according to claim 1, wherein the color matrix preparing section prepares the color matrix by defining each component of the color matrix as a function f(x), and the brightness value is substituted for x.

32. A signal processing apparatus according to claim 1, wherein the color matrix preparing section prepares the color matrix by weighting in accordance with the brightness on the basis of the color matrix for photopic vision and the color matrix for scotopic vision.

33. A signal processing apparatus according to claim 32, wherein the weighting changes linearly with respect to the brightness, as the following formula: color matrix=(1−x)(color matrix for scotopic vision)+x(color matrix for photopic vision).

34. A signal processing apparatus according to claim 32, wherein the weighting changes with respect to the brightness, as the following exponential function $e^x$: color matrix=$(1-e^x)$(color matrix for scotopic vision)+$e^x$ (color matrix for photopic vision).

35. A signal processing apparatus according to claim 32, wherein the weighting changes by a sigmoid function as in the following formula, where an output with respect to a logarithmic value of the brightness is different for the color matrix for photopic vision and the color matrix for scotopic vision: color matrix=1/{1+exp(x)}(color matrix for scotopic vision)+1/{1+ext(−x)}(color matrix for photopic vision).

36. A signal processing apparatus according to claim 32, wherein the color matrix preparing section takes an average value of pixel signal values of both ends of three adjacent pixels where a color matrix changes in photopic vision and scotopic vision to obtain a middle pixel signal value, so that the color matrix preparing section can change the color matrix such that the color matrix is changed to increase or decrease successively.

37. A signal processing apparatus according to claim 1, wherein the color matrix preparing section is provided with a storing section for storing in advance a predetermined color matrix used during photopic vision, and the color matrix preparing section performs processing using the color matrix in the storing section during photopic vision.

38. A signal processing apparatus according to claim 1, wherein one color matrix or a plurality of color matrices used during scotopic vision in accordance with brightness are stored in advance in the storing section, and the color matrix preparing section reads out the color matrix for scotopic vision to set a color matrix.

39. A signal processing apparatus according to claim 1, wherein a switch section for forcibly determining that it is scotopic vision, is provided externally.

40. A signal processing apparatus according to claim 1, wherein the color matrix in accordance with the detected brightness of the pixel is color matrices for photopic vision and scotopic vision in accordance with the brightness of the pixel.

41. A signal processing apparatus according to claim 40, wherein the color matrix for scotopic vision is one color matrix or a plurality of color matrices in accordance with the brightness of the pixel.

42. A solid-state image capturing apparatus for performing color matrix processing and color adjustment processing, using the signal processing apparatus according to claim 1, wherein the solid-state image capturing apparatus is provided with a plurality of light receiving sections for performing a photoelectric conversion on and capturing an image of image light from an image-capturing subject, as the plurality of pixels.

43. An electronic information device using the solid-state image capturing apparatus according to claim 42, as an image input device, in an image capturing section thereof.

44. A signal processing method for processing pixel signals corresponding to a plurality of respective pixels, comprising:
   a color matrix step, in which a color matrix section detects brightness of the pixels and performs color adjustment processing on the pixel signals using a color matrix in accordance with the detected brightness of the pixel,
   wherein the color matrix step includes:
   a light amount comparing step of a light amount comparing unit detecting brightness of the pixel to compare the detected brightness with a predetermined threshold;
   a color matrix preparing step of a color matrix preparing section preparing a color matrix such that at least one non-diagonal component of the color matrix increases in accordance with the decrease in the detected brightness from the predetermined threshold; and
   a coloring step of a coloring circuit multiplying the prepared color matrix by an output pixel signal for each pixel, for each plurality of pixels or for each one or plurality of pixels sampled from a plurality of pixels, to perform color adjustment.

45. A non-transitory computer readable storage medium storing a control program in which processing procedures for allowing a computer to execute each of the steps of the signal processing method according to claim 44 are described.

* * * * *